(12) United States Patent
Kawano et al.

(10) Patent No.: US 12,526,865 B2
(45) Date of Patent: Jan. 13, 2026

(54) TERMINAL APPARATUS, METHOD, AND INTEGRATED CIRCUIT

(71) Applicant: SHARP KABUSHIKI KAISHA, Sakai (JP)

(72) Inventors: Takuma Kawano, Sakai (JP); Shohei Yamada, Sakai (JP); Hidekazu Tsuboi, Sakai (JP); Kyosuke Inoue, Sakai (JP); Taichi Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 427 days.

(21) Appl. No.: 18/107,948

(22) Filed: Feb. 9, 2023

(65) Prior Publication Data
US 2024/0114574 A1    Apr. 4, 2024

(30) Foreign Application Priority Data
Sep. 29, 2022   (JP) .................................. 2022-156294

(51) Int. Cl.
*H04W 76/18* (2018.01)
*H04L 45/00* (2022.01)
(Continued)

(52) U.S. Cl.
CPC ............ *H04W 76/18* (2018.02); *H04L 45/22* (2013.01); *H04W 40/16* (2013.01); *H04W 76/15* (2018.02)

(58) Field of Classification Search
CPC ..... H04W 76/18; H04W 40/16; H04W 76/15; H04W 36/0069; H04W 88/04; H04W 92/10; H04W 92/18; H04W 76/19; H04W 40/22; H04W 40/34; H04W 76/14; H04L 45/22
See application file for complete search history.

(56) References Cited

U.S. PATENT DOCUMENTS

2023/0127850 A1*  4/2023  Teyeb ............. H04W 36/00698
                                                   370/329
2024/0098619 A1*  3/2024  Elazzouni ............. H04W 76/30
(Continued)

FOREIGN PATENT DOCUMENTS

WO   2023108641 A1   6/2023
WO   2023134679 A1   7/2023
(Continued)

OTHER PUBLICATIONS

3GPP TS 38.331 V17.0.0 (Mar. 2022) 3rd Generation Partnership Project; Technical Specification Group Radio Access Network; NR; Radio Resource Control (RRC) protocol specification (Release 17).
(Continued)

*Primary Examiner* — Sudesh M. Patidar
(74) *Attorney, Agent, or Firm* — ScienBiziP, P.C.

(57) ABSTRACT

A terminal apparatus for communicating with a base station apparatus by using a direct path and an indirect path determines whether a signaling radio bearer is configured on an indirect path in a case that radio link failure is detected on the direct path, and transmits information indicating that the radio link failure has occurred on the direct path via the signaling radio bearer in a case that the signaling radio bearer is determined to be configured on the indirect path.

3 Claims, 10 Drawing Sheets

(51) Int. Cl.
    *H04W 40/16*     (2009.01)
    *H04W 76/15*     (2018.01)

(56) References Cited

U.S. PATENT DOCUMENTS

| | | | | |
|---|---|---|---|---|
| 2024/0397570 | A1* | 11/2024 | Shapin | H04W 28/08 |
| 2025/0048483 | A1* | 2/2025 | Cheng | H04W 76/19 |

FOREIGN PATENT DOCUMENTS

| | | | | | |
|---|---|---|---|---|---|
| WO | WO-2024058543 | A1 | * | 3/2024 | H04W 76/15 |
| WO | WO-2024094228 | A1 | * | 5/2024 | H04W 76/30 |

OTHER PUBLICATIONS

3GPP TS 38.321 V17.0.0 (Mar. 2022) 3rd Generation Partnership Project; Technical Specification Group Radio Access Network; NR; Medium Access Control (MAC) protocol specification (Release 17).
3GPP TS 38.213 V17.2.0 (Jun. 2022) 3rd Generation Partnership Project; Technical Specification Group Radio Access Network; NR; Physical layer procedures for control (Release 17).
3GPP TS 38.215 V17.1.0 (Mar. 2022) 3rd Generation Partnership Project; Technical Specification Group Radio Access Network; NR; Physical layer measurements (Release 17).
3GPP TS 23.304 V17.1.0 (Dec. 2021) 3rd Generation Partnership Project; Technical Specification Group Services and System Aspects; Proximity based Services (ProSe) in the 5G System (5GS) (Release 17).
3GPP TS 38.300 V17.0.0 (Mar. 2022) 3rd Generation Partnership Project; Technical Specification Group Radio Access Network; NR; NR and NG-RAN Overall Description; Stage 2 (Release 17).
LG Electronics, "Revised WID on NR sidelink relay enhancements", RP-221262, (revision of RP-221010), 3GPP TSG RAN Meeting #96, Budapest, Hungary, Jun. 6-9, 2022.
ZTE, "Initial considerations on multi-path relaying", R2-2207187, 3GPP TSG-RAN WG2 Meeting #119 electronic, Online, Aug. 2022.
Vivo, "Multi-path UE aggregation on PC5 and Ideal-link", R2-2208081, 3GPP TSG-RAN WG2 Meeting #119-e, Online, Aug. 17-29, 2022.
Samsung, "(TP to TS38.401 on SL Relay) Discussion on multipath for sidelink relay", R3-224831, 3GPP TSG-RAN WG3 #117-e, Aug. 15-Aug. 24, 2022.
OPPO, "Discussion on multi-path SL relay", R2-2211207, 3GPP TSG-RAN WG2 #120, Toulouse, France, Nov. 2022.
Apple, "Summary of AI 8.9.4, Multi-path relaying", R2-2213122, 3GPP TSG-RAN WG2 Meeting #120, Toulouse, France, Nov. 14-18, 2022.
ZTE, "Discussion on the remaining issues of multi-path relaying", R2-2211814, 3GPP TSG-RAN WG2 Meeting #120, Toulouse, France, Nov. 2022.
Nokia et al., "Multipath sidelink relay", R2-2212722, 3GPP TSG-RAN WG2 Meeting #120, Toulouse, France, Nov. 14-18, 2022.
ETSI MCC, "Report of 3GPP TSG RAN WG2 meeting #119bis-e, Online", R2-22xxxxx, 3GPP TSG-RAN WG2 Meeting #120, Online, Oct. 10-19, 2022.

* cited by examiner

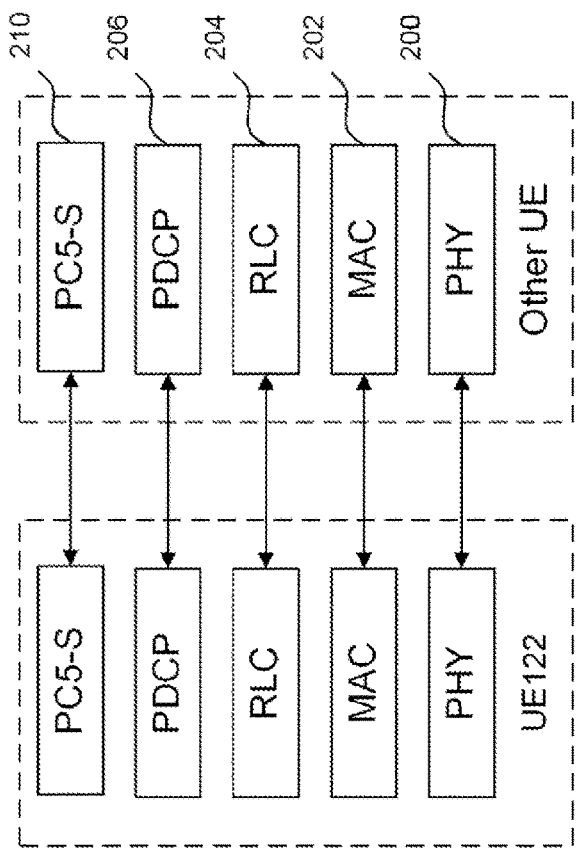
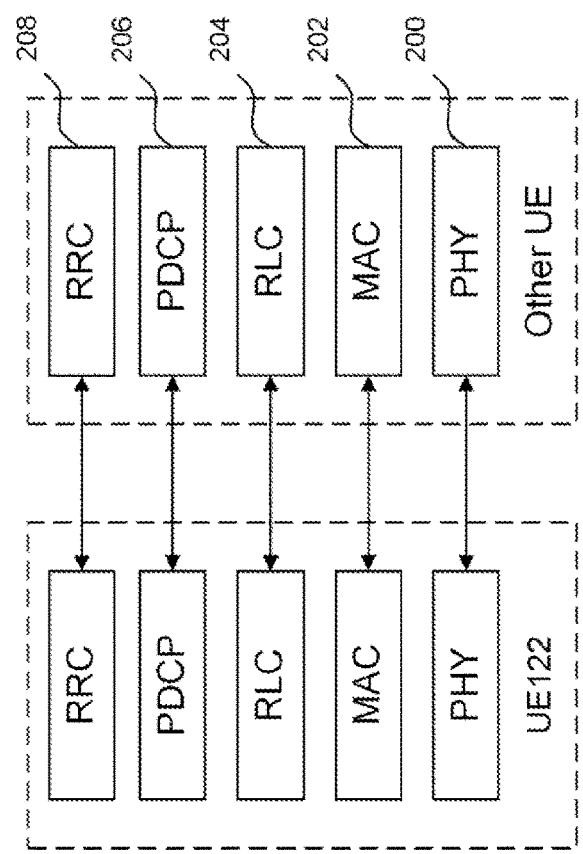
FIG. 2B
FIG. 2A

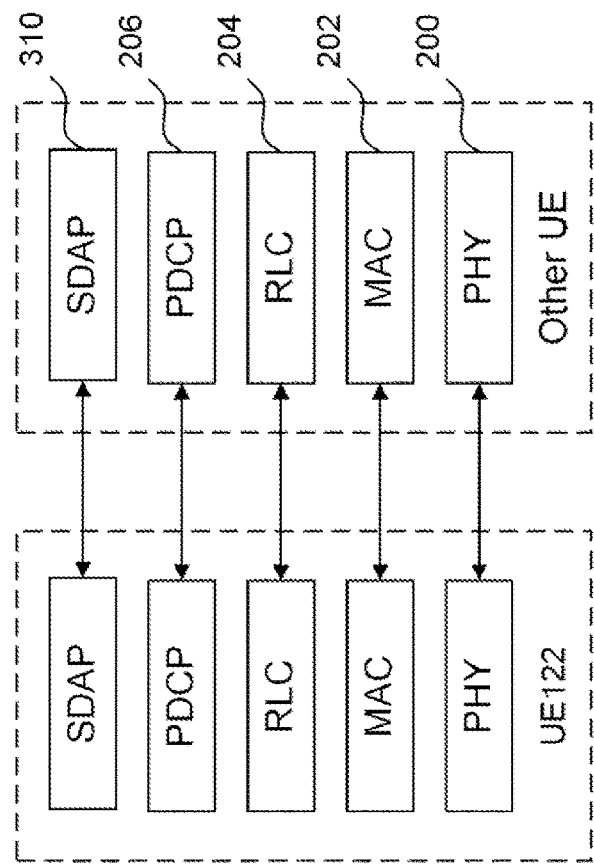
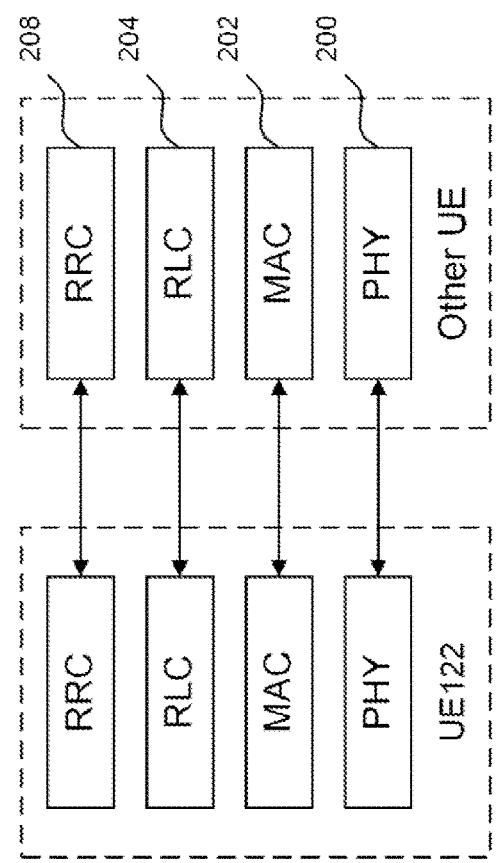
FIG. 3B
FIG. 3A

TERMINAL APPARATUS, METHOD, AND INTEGRATED CIRCUIT

TECHNICAL FIELD

The present invention relates to a terminal apparatus, a method, and an integrated circuit.

BACKGROUND ART

In the 3rd Generation Partnership Project (3GPP) that is a standardization project for cellular mobile communication systems, technical study and standardization have been carried out on the cellular mobile communication systems including radio access, core networks, services, and the like.

For example, the 3GPP has started technical study and standardization on Evolved Universal Terrestrial Radio Access (E-UTRA) as a radio access technology (RAT) for cellular mobile communication systems for the 3.9th generation and 4th generation. At present as well, the 3GPP carries out technical study and standardization on extended technologies of E-UTRA. Further, E-UTRA may also be referred to as Long Term Evolution (LTE: registered trademark), and its extended technology may also be referred to as LTE-Advanced (LTE-A) and LTE-Advanced Pro (LTE-A Pro).

In addition, the 3GPP has started technical study and standardization on New Radio or NR Radio access (NR) as a radio access technology (RAT) for cellular mobile communication systems for the 5th generation (5G). At present as well, the 3GPP carries out technical study and standardization on extended technologies of NR.

CITATION LIST

Non Patent Literature

NPL 1: 3GPP TS 38.331 v17.0.0, "Evolved Universal Terrestrial Radio Access (E-UTRA); Radio Resource Control (RRC); Protocol specifications", pp 37-1107
NPL 2: 3GPP TS 38.321 v17.0.0, "NR; Medium Access Control (MAC) protocol specification", pp 17-104
NPL 3: 3GPP TS 38.213 V17.2.0, "NR; Physical layer procedures for control", pp 14-20
NPL 4: 3GPP TS 38.215 V17.1.0, "NR; Physical layer measurements", pp 16-18
NPL 5: 3GPP TS 23.304 v17.1.0, "Proximity based Services (ProSe) in the 5G System (5GS)", pp 12-97
NPL 6: 3GPP TS 38.300 v17.0.0, "NR; NR and NG-RAN Overall Description", pp 31-170
NPL 7: RP-221262, "Revised WID on NR sidelink relay enhancements"

SUMMARY OF INVENTION

Technical Problem

The 3GPP has studied, as an extended technique of NR, a technique called sidelink (SL) in which terminal apparatuses directly communicate with each other without going through a core network, and a technique called UE-to-Network Relay (U2N Relay) in which a relay terminal apparatus provides communication through sidelink and thus a terminal apparatus communicates with a base station apparatus via the relay terminal apparatus has been studied. Furthermore, a study has started on a technique called multi-path relaying in which a terminal apparatus communicates with a base station apparatus using two (or a plurality of) paths including an indirect path on which it can communicate with the base station apparatus using U2N relay and a direct path on which it can directly communicate with the base station apparatus without using the U2N relay.

One aspect of the present invention has been made in light of the above-described circumstances, and an object of the present invention is to provide a terminal apparatus, a communication method, and an integrated circuit, which enable efficient communication control.

Solution to Problem

In order to accomplish the object described above, an aspect of the present invention is contrived to provide the following means. That is, an aspect of the present invention is a terminal apparatus for communicating with a base station apparatus by using a direct path and an indirect path, the terminal apparatus including a processor and a transmitter, wherein the direct path is a path through which the terminal apparatus directly communicates with the base station apparatus via a Uu interface, the indirect path is a path through which the terminal apparatus communicates with the base station apparatus via a relay terminal apparatus, and in a case that radio link failure is detected on the direct path and a signaling radio bearer is not configured with a split bearer, the processor determines whether the signaling radio bearer is configured on the indirect path, and in a case that the signaling radio bearer is determined to be configured on the indirect path, the transmitter transmits, via the signaling radio bearer, information indicating that the radio link failure has occurred on the direct path.

In addition, an aspect of the present invention is a method of a terminal apparatus for communicating with a base station apparatus by using a direct path and an indirect path, wherein the direct path is a path through which the terminal apparatus directly communicates with the base station apparatus via a Uu interface, the indirect path is a path through which the terminal apparatus communicates with the base station apparatus via a relay terminal apparatus, and in a case that radio link failure is detected on the direct path and a signaling radio bearer is not configured with a split bearer, whether the signaling radio bearer is configured on the indirect path is determined, and in a case that the signaling radio bearer is determined to be configured on the indirect path, information indicating that the radio link failure has occurred on the direct path is transmitted via the signaling radio bearer.

In addition, an aspect of the present invention is an integrated circuit implemented in a terminal apparatus for communicating with a base station apparatus by using a direct path and an indirect path, wherein the direct path is a path through which the terminal apparatus directly communicates with the base station apparatus via a Uu interface, the indirect path is a path through which the terminal apparatus communicates with the base station apparatus via a relay terminal apparatus, and in a case that radio link failure is detected on the direct path and a signaling radio bearer is not configured with a split bearer, determining of whether the signaling radio bearer is configured on the indirect path is caused to be performed, and in a case that the signaling radio bearer is determined to be configured on the indirect path, transmitting of information via the signaling radio bearer is caused to be performed, the information indicating that the radio link failure has occurred on the direct path.

Further, these comprehensive or specific aspects may be realized in a system, an apparatus, a method, an integrated circuit, a computer program, or a recording medium, or may be realized in any combination of the system, apparatus, method, integrated circuit, computer program, and recording medium.

Advantageous Effects of Invention

According to an aspect of the present invention, the terminal apparatus, the method, and the integrated circuit can realize efficient communication control processing.

BRIEF DESCRIPTION OF DRAWINGS

FIGS. 2A and 2B are diagrams illustrating an example of a protocol architecture of sidelink according to the present embodiment.

FIGS. 3A and 3B are diagrams illustrating an example of a protocol architecture of sidelink according to the present embodiment.

DESCRIPTION OF EMBODIMENTS

The present embodiment will be described below in detail with reference to the drawings.

Further, although names of nodes and entities and processing by the nodes and entities in a case that the radio access technology is NR will be described in the present embodiment, the present embodiment may be applied to other radio access technologies. The name of each node or entity in the present embodiment may vary.

Figure 1:
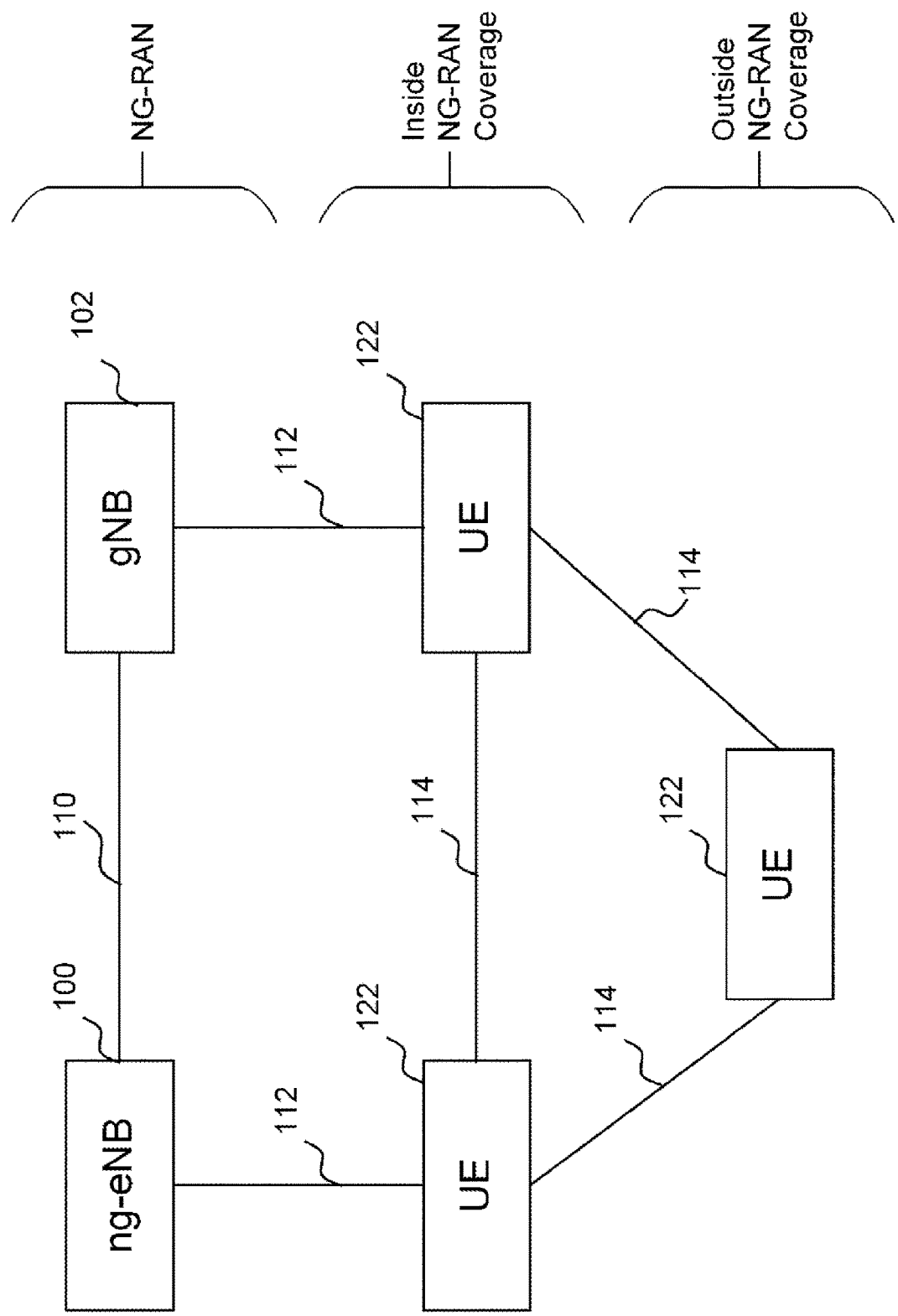
FIG. 1 is a schematic diagram of a communication system according to the present embodiment.

FIG. 1 is a schematic diagram of a communication system according to the present embodiment. Further, the functions of nodes, radio access technologies, core networks, interfaces, and the like described with reference to FIG. 1 are some functions closely related to the present embodiment, and may have other functions.

E-UTRA may be a radio access technology. In addition, E-UTRA may be an air interface between UE 122 and ng-eNB 100. The air interface 112 between the UE 122 and the ng-eNB 100 may be called a Uu interface. The ng E-UTRAN Node B (ng-eNB) 100 may be a base station apparatus of the E-UTRA. The ng-eNB 100 may have an E-UTRA protocol described below. The E-UTRA protocol may include an E-UTRA user plane (UP) protocol to be described later and an E-UTRA control plane (CP) protocol to be described later. The ng-eNB 100 may terminate the E-UTRA user plane protocol and the E-UTRA control plane protocol for the UE 122. A radio access network comprised of eNBs may be called an E-UTRAN.

NR may be a radio access technology. In addition, NR may be an air interface between the UE 122 and a gNB 102. The air interface 112 between the UE 122 and the gNB 102 may be called a Uu interface. The gNode B (gNB) 102 is a base station apparatus of NR. The gNB 102 may have the NR protocol described below. The NR protocol may include an NR user plane (UP) protocol to be described later and an NR control plane (CP) protocol to be described later. The gNB 102 may terminate the NR user plane protocol and the NR control plane protocol for the UE 122.

Further, an interface 110 between the ng-eNB 100 and the gNB 102 may called an Xn interface. In addition, the ng-eNB and the gNB may be connected to the 5GC via an interface called an NG interface (not illustrated). The 5GC may be a core network. One or more base station apparatuses may connect to the 5GC via an NG interface.

A state in which a connection to a base station apparatus can be made only via a Uu interface may be referred to as inside NG-RAN coverage or in-coverage (IC). In addition, a state in which a connection to a base station apparatus cannot be made only via the Uu interface may be referred to as outside NG-RAN coverage or out-of-coverage (OOC). An air interface 114 between the UE 122 and other UE 122 may be called a PC5 interface. Communication between UE 122 via the PC5 interface may be called sidelink (SL) communication.

Further, in the following description, the ng-eNB 100 and/or the gNB 102 are simply referred to as a base station apparatus, and the UE 122 is also simply referred to as a terminal apparatus or UE. In addition, the PC5 interface is also simply referred to as PC5, and the Uu interface is also simply referred to as Uu.

Sidelink is a technique for performing direct communication between terminal apparatuses, and sidelink transmission and/or reception on the PC5 are performed inside the NG-RAN coverage and outside the NG-RAN coverage.

NR SL communication has three transmission modes, and SL communication is performed in one of the transmission modes paired with a source layer-2 identifier (Source Layer-2 ID) and a destination layer-2 identifier (Destination Layer-2 ID). The source layer-2 identifier and the destination layer-2 identifier may be referred to as a source L2ID and a destination L2ID, respectively. The three transmission modes are "unicast transmission", "groupcast transmission", and "broadcast transmission".

Unicast transmission is characterized by (1) support for one PC5-RRC connection between paired pieces of UE, (2) transmission and/or reception of control information and user traffic between pieces of UE on sidelink, (3) support for sidelink HARQ feedback, (4) transmitted power control on sidelink, (5) support for RLC AM, and (6) detection of failure in radio link for a PC5-RRC connection.

In addition, groupcast transmission is also characterized by (1) transmission and/or reception of user traffic between pieces of UE belonging to a sidelink group and (2) support for sidelink HARQ feedback.

In addition, broadcast transmission is characterized by (1) transmission and/or reception of user traffic between pieces of UE on sidelink.

FIGS. 2A and 2B and FIGS. 3A and 3B are diagrams illustrating examples of protocol architectures in NR sidelink communication according to the present embodiment. Further, the functions of the protocols described with reference to FIGS. 2A and 2B and/or FIGS. 3A and 3B are some functions closely related to the present embodiment, and other functions may be included. Further, in the present embodiment, sidelink (SL) may be a link between terminal apparatuses.

FIG. 2A is a diagram of a protocol stack of the control plane (CP) for an SCCH using RRC configured on a PC5 interface. As illustrated in FIG. 2A, the control plane protocol stack for the SCCH using RRC may include a physical layer (PHY) 200 which is a radio physical layer, medium access control (MAC) 202 which is a medium access control layer, radio link control (RLC) 204 which is a radio link control layer, a packet data convergence protocol (PDCP) 206 which is a packet data convergence protocol layer, and radio resource control (RRC) 208 which is a radio resource control layer. In addition, FIG. 2B is a diagram of a protocol stack of the control plane for the SCCH using PC5-S configured on the PC5 interface. As illustrated in FIG. 2B, the control plane protocol stack for the SCCH using PC5-S may include a physical layer (PHY) 200 which is a radio physical layer, medium access control (MAC) 202 which is a medium access control layer, radio link control (RLC) 204 which is a radio link control layer, a packet data convergence protocol (PDCP) 206 which is a packet data convergence protocol layer, and PC5 signaling (PC5-S) 210 which is a PC5 signaling layer.

FIG. 3A is a diagram of a protocol stack of the control plane for the SBCCH configured on the PC5 interface. As illustrated in FIG. 3A, the control plane protocol stack for the SBCCH may include a physical layer (PHY) 200 that is a radio physical layer, a medium access control (MAC) 202 that is a medium access control layer, radio link control (RLC) 204 that is a radio link control layer, and radio resource control (RRC) 208 that is a radio resource control layer. In addition, FIG. 3B is a diagram of a protocol stack of the user plane (UP) for an STCH configured on the PC5 interface. As illustrated in FIG. 3B, the user plane protocol stack for the STCH may include a physical layer (PHY) 200 which is a radio physical layer, medium access control (MAC) 202 which is a medium access control layer, radio link control (RLC) 204 which is a radio link control layer, a packet data convergence protocol (PDCP) 206 which is a packet data convergence protocol layer, and a service data adaptation protocol (SDAP) 310 that is a service data adaptation protocol layer.

Further, an access stratum (AS) layer may be a layer including some or all of the PHY 200, the MAC 202, the RLC 204, the PDCP 206, the SDAP 310, and the RRC 208. In addition, the PC5-S 210 and Discovery 400 to be described later may be layers higher than the AS layer.

Further, in the present embodiment, terms such as PHY (PHY layer), MAC (MAC layer), RLC (RLC layer), PDCP (PDCP layer), SDAP (SDAP layer), RRC (RRC layer), and PC5-S (PC5-S layer) may be used. In this case, PHY (PHY layer), MAC (MAC layer), RLC (RLC layer), PDCP (PDCP layer), SDAP (SDAP layer), RRC (RRC layer), PC5-S (PC5-S layer) may be PHY (PHY layer), MAC (MAC layer), RLC (RLC layer), PDCP (PDCP layer), SDAP (SDAP layer), RRC (RRC layer), and PC5-S (PC5-S layer) of an NR sidelink protocol, respectively. Further, in a case that sidelink communication is performed using the E-UTRA technique, the SDAP layer may not be provided. Further, in order to make it clear that the protocol is a sidelink protocol, for example, the PDCP may be expressed as a sidelink PDCP or the like, and other protocols may also be expressed as sidelink protocols by prefixing "sidelink" thereto.

In addition, in order to distinguish an E-UTRA protocol from an NR protocol in the present embodiment, the PHY, MAC, RLC, PDCP, and RRC may be respectively referred to as a PHY for E-UTRA or PHY for LTE, MAC for E-UTRA or MAC for LTE, RLC for E-UTRA or RLC for LTE, PDCP for E-UTRA or PDCP for LTE, and RRC for E-UTRA and RRC for LTE. In addition, the PHY, MAC, RLC, PDCP, and RRC may be respectively described as E-UTRA PHY or LTE PHY, E-UTRA MAC or LTE MAC, E-UTRA RLC or LTE RLC, E-UTRA PDCP or LTE PDCP, and E-UTRA RRC or LTE RRC, and the like. In addition, in a case that the E-UTRA protocol is to be distinguished from the NR protocol, the PHY, MAC, RLC, PDCP, and RRC may be referred to as a PHY for NR, MAC for NR, RLC for NR, PDCP for NR, and RRC for NR, respectively. In addition, the PHY, MAC, RLC, PDCP, and RRC may be described as an NR PHY, NR MAC, NR RLC, NR PDCP, NR RRC, and the like, respectively.

Entities in the AS layer of E-UTRA and/or NR will now be described. An entity having some or all of the functions of the physical layer may be referred to as a PHY entity. An entity having some or all of the functions of the MAC layer may be referred to as a MAC entity. An entity having some or all of the functions of the RLC layer may be referred to as an RLC entity. An entity having some or all of the functions of the PDCP layer may be referred to as a PDCP entity. An entity having some or all of the functions of the SDAP layer may be referred to as an SDAP entity. An entity having some or all of the functions of the RRC layer may be referred to as an RRC entity. A PHY entity, a MAC entity, an RLC entity, a PDCP entity, an SDAP entity, and an RRC entity may be rephrased as PHY, MAC, RLC, PDCP, SDAP, and RRC, respectively.

Further, data provided to a lower layer from the MAC, RLC, PDCP, and SDAP and/or data provided from a lower layer to the MAC, RLC, PDCP, and SDAP may be referred to as a MAC protocol data unit (PDU), an RLC PDU, a PDCP PDU, and an SDAP PDU, respectively. In addition, data provided from a higher layer to the MAC, RLC, PDCP, and SDAP, and/or data provided to a higher layer from the MAC, RLC, PDCP, and SDAP may be referred to as a MAC service data unit (SDU), an RLC SDU, a PDCP SDU, and an SDAP SDU, respectively. In addition, a segmented RLC SDU is referred to as an RLC SDU segment.

Here, the base station apparatus and the terminal apparatus exchange (transmit and/or receive) signals to and/or from each other in a higher layer via the Uu interface. A higher layer may be referred to as an upper layer, and they may be paraphrased with each other. For example, in the radio resource control (RRC) layer, the base station apparatus and the terminal apparatus may transmit and/or receive an RRC message (which is also referred to as RRC signaling). In addition, in a medium access control (MAC) layer, the base station apparatus and the terminal apparatus may transmit and/or receive a MAC control element (MAC CE). In addition, the RRC layer of the terminal apparatus acquires system information broadcast from the base station apparatus. Here, the RRC message, the system information, and/or the MAC control element are also referred to as higher layer signaling or a higher layer parameter. Each of parameters included in the higher layer signaling received by the terminal apparatus may be referred to as a higher layer parameter. For example, since a higher layer in processing of the PHY layer means a higher layer as viewed from the PHY layer, it may mean one or multiple of the MAC layer, the RRC layer, the RLC layer, the PDCP layer, a Non Access Stratum (NAS) layer, or the like. For example, a higher layer in processing of the MAC layer may mean one or multiple of the RRC layer, the RLC layer, the PDCP layer, the NAS layer, or the like.

In addition, base station apparatuses exchange (transmit and/or receive) signals to and/or from each other in a higher layer on the PC5 interface. For example, in the radio resource control (RRC) layer, terminal apparatuses may transmit and/or receive an RRC message (which is also referred to as RRC signaling). In addition, in a medium access control (MAC) layer, the base station apparatuses and the terminal apparatuses may transmit and/or receive a MAC control element (MAC CE). Here, the RRC message and/or the MAC control element are also referred to as higher layer signaling or a higher layer parameter. Each of parameters included in the higher layer signaling received by the terminal apparatuses may be referred to as a higher layer parameter. For example, since a higher layer in processing of the PHY layer means a higher layer as viewed from the PHY layer, it may mean one or multiple of the MAC layer, the RRC layer, the RLC layer, the PDCP layer, the PC5-S layer, the Discovery layer, or the like. For example, a higher layer in processing of the MAC layer may mean one or multiple of the RRC layer, the RLC layer, the PDCP layer, the PC5-S layer, the Discovery layer, or the like.

Hereinafter, "A is given (provided) in a higher layer" or "A is given (provided) by a higher layer" may mean that a higher layer (mainly the RRC layer, the MAC layer, or the like) of the terminal apparatus receives A from the base station apparatus or another terminal apparatus and the received A is given (provided) from the higher layer of the terminal apparatus to the physical layer of the terminal apparatus. For example, "being provided with a higher layer parameter" to the terminal apparatus may mean that higher layer signaling is received from the base station apparatus or another terminal apparatus and the higher layer parameter included in the received higher layer signaling is provided from the higher layer of the terminal apparatus to the physical layer of the terminal apparatus. Configuring a higher layer parameter to the terminal apparatus may mean that a higher layer parameter is given (provided) to the terminal apparatus. For example, configuring a higher layer parameter to the terminal apparatus may mean that the terminal apparatus receives higher layer signaling from the base station apparatus or another terminal apparatus and configures the received higher layer parameter in the higher layer. However, configuring a higher layer parameter to the terminal apparatus may mean that a pre-given default parameter is configured to the higher layer of the terminal apparatus. To describe transmission of an RRC message from a terminal apparatus to a base station apparatus or another terminal apparatus, the expression that a message is submitted from an RRC entity of the terminal apparatus to a lower layer may be used. "Submitting a message to a lower layer" in a terminal apparatus from an RRC entity may mean that a message is submitted to the PDCP layer. "Submitting a message to a lower layer" in a terminal apparatus from the RRC layer may mean that the message from the RRC is submitted to a PDCP entity corresponding to each SRB (SRB0, SRB1, SRB2, SRB3, etc.) since the message is transmitted using an SRB. When the RRC entity of the terminal apparatus receives an indication from a lower layer, the lower layer may mean one or more of the PHY layer, MAC layer, RLC layer, PDCP layer, and the like.

An example of the functions of the PHY will be described. The PHY of a terminal apparatus may have a function of transmitting and/or receiving data transmitted through a sidelink (SL) physical channel to and/or from the PHY of another terminal apparatus. The PHY may be connected to the MAC of a higher layer via a transport channel. The PHY may exchange data with the MAC via the transport channel. In addition, the PHY may be provided with data from the MAC via the transport channel. In the PHY, a radio network temporary identifier (RNTI) may be used in order to identify various pieces of control information.

Now, physical channels will be described. Examples of physical channels used in radio communication between a terminal apparatus and another terminal apparatus include the following physical channels.

Physical sidelink broadcast channel (PSBCH)
Physical sidelink control channel (PSCCH)
Physical sidelink shared channel (PSSCH)
Physical sidelink feedback channel (PSFCH)

The PSBCH may be used to broadcast system information required by the terminal apparatus.

The PSCCH may be used to indicate resources or other transmission parameters for the PSSCH.

The PSSCH may be used to transmit data and control information related to HARQ/CSI feedback to another terminal apparatus.

The PSFCH may be used to carry HARQ feedback to another terminal apparatus.

An example of functions of the MAC will be described. The MAC may be called a MAC sublayer. The MAC may have a function of mapping various logical channels to corresponding transport channels. The logical channels may be identified with a logical channel identifier (logical channel identity, or logical channel ID). The MAC may be connected to the RLC of a higher layer via a logical channel. The logical channels may be classified into a control channel for transmitting control information and a traffic channel for transmitting user information depending on the type of information to be transmitted. The MAC may have a function of multiplexing MAC SDUs belonging to one or more different logical channels and providing the multiplexed MAC SDUs to the PHY. In addition, the MAC may have a function of demultiplexing a MAC PDU provided from the PHY and providing the demultiplexed MAC PDU to a higher layer through a logical channel to which each MAC SDU belongs. Furthermore, the MAC may have a function of performing error correction through a hybrid automatic repeat request (HARQ). In addition, the MAC may also have a function of reporting scheduling information. The MAC may have a function of performing priority processing between terminal apparatuses by using dynamic scheduling. In addition, the MAC may have a function of performing priority processing between logical channels within one terminal apparatus. The MAC may have a function of performing priority processing of overlapping resources within one terminal apparatus. E-UTRA MAC may have a function of identifying multimedia broadcast multicast services (MBMS). In addition, NR MAC has the function of identifying multicast and broadcast services (MBS). The MAC may have a function of selecting a transport format. The MAC may have a function of performing discontinuous reception (DRX) and/or discontinuous transmission (DTX), a function of performing a random access (RA) procedure, a power headroom report (PHR) function of giving notification of information about transmittable power, a buffer status report (BSR) function of giving notification of information about a data amount of a transmission buffer, and the like. The NR MAC may have a bandwidth adaptation (BA) function. In addition, a MAC PDU format used in the E-UTRA MAC may be different from a MAC PDU format used in the NR MAC. In addition, the MAC PDU may include a MAC control element (MAC CE) which is an element for performing control over the MAC.

In addition, a MAC sublayer may additionally provide services and functions on the PC5 interface, such as radio resource selection for selecting radio resources to perform sidelink transmission, filtering of packets received in sidelink communication, priority processing between uplink and sidelink, sidelink channel state information (sidelink CSI) reporting, etc.

Sidelink (SL) logical channels used in E-UTRA and/or NR and mapping of sidelink logical channels to transport channels will be described.

A sidelink broadcast control channel (SBCCH) may be a sidelink logical channel for broadcasting sidelink system information from one terminal apparatus to one or a plurality of terminal apparatuses. In addition, the SBCCH may also be mapped to a sidelink transport channel, SL-BCH.

A sidelink control channel (SCCH) may be a sidelink logical channel for transmitting control information such as a PC5-RRC message or a PC5-S message from one terminal apparatus to one or a plurality of terminal apparatuses. In addition, the SCCH may be mapped to a sidelink transport channel, SL-SCH.

A sidelink traffic control channel (STCH) may be a sidelink logical channel for transmitting user information from one terminal apparatus to one or a plurality of terminal apparatuses. In addition, the STCH may be mapped to a sidelink transport channel, SL-SCH.

An example of functions of the RLC will be described. The RLC may be called an RLC sublayer. The E-UTRA RLC may have a function of segmenting and/or concatenating data provided from the PDCP of a higher layer and providing the data to a lower layer. The E-UTRA RLC may have a function of performing reassembling and re-ordering data provided from a lower layer and providing the data to a higher layer. The NR RLC may have a function of giving a sequence number independent of the sequence number added by the PDCP of a higher layer to the data provided from the PDCP. In addition, the NR RLC may have a function of segmenting data provided from the PDCP and providing the data to a lower layer. In addition, the NR RLC may have a function of reassembling data provided from a lower layer and providing the data to a higher layer. In addition, the RLC may have a data retransmission function and/or a retransmission request function (automatic repeat request or ARQ). In addition, the RLC may have a function of performing error correction by using ARQ. Control information indicating data that needs to be retransmitted, which is transmitted from the reception side to the transmission side of the RLC in order to perform ARQ, may be referred to as a status report. In addition, an indication of transmission of status report transmitted from the transmission side to the reception side of the RLC is referred to as a poll. In addition, the RLC may have a function of detecting data duplication. In addition, the RLC may have a function of data discard. The RLC may have three modes of a transparent mode (TM), an unacknowledged mode (UM), and an acknowledged mode (AM). In the TM, data received from a higher layer is not segmented, and no RLC header is not added. A TM RLC entity is a uni-directional entity and may be configured as a transmitting TM RLC entity or a receiving TM RLC entity. Although data received from a higher layer is segmented and/or concatenated, an RLC header is added, and the like in the UM, retransmission control of data is not performed. A UM RLC entity may be a uni-directional entity or a bi-directional entity. In a case that a UM RLC entity is a uni-directional entity, the UM RLC entity may be configured as a transmitting UM RLC entity or a receiving UM RLC entity. In a case that a UM RLC entity is a bi-directional entity, the UM RRC entity may be configured as a UM RLC entity configured in a transmitting side and a receiving side. In the AM, data received from a higher layer may be segmented and/or concatenated, an RLC header may be added, retransmission control of data is performed, and the like. An AM RLC entity is a bi-directional entity and may be configured as an AM RLC configured in a transmitting side and a receiving side. Further, data provided to a lower layer and/or data provided from a lower layer in the TM may be called a TMD PDU. In addition, data provided to a lower layer and/or data provided from a lower layer in the UM may be called a UMD PDU. In addition, data provided to a lower layer and/or data provided from a lower layer in the AM may be called an AMD PDU. An RLC PDU format used in the E-UTRA RLC may be different from an RLC PDU format used in the NR RLC. In addition, the RLC PDU may include a data RLC PDU and a control RLC PDU. The data RLC PDU may be called an RLC data PDU. In addition, control RLC PDU may be called an RLC control PDU.

Further, in sidelink, the TM may be used for an SBCCH, only the UM is used in groupcast transmission and broadcast transmission, and the UM and AM can be used in unicast transmission. In addition, in sidelink, the UM in groupcast transmission and broadcast transmission supports only unidirectional transmission.

An example of functions of the PDCP will be described. The PDCP may be called a PDCP sublayer. The PDCP may have a function of maintaining sequence numbers. In addition, the PDCP may have a header compression/decompression function for efficiently transmitting user data such as IP packets, Ethernet frames, and the like over a radio section. A protocol used for header compression/decompression of an IP packet may be called a robust header compression (ROHC) protocol. In addition, a protocol used for Ethernet (registered trademark) frame header compression/decompression may be called an Ethernet Header Compression (EHC) protocol. In addition, the PDCP may have a data encryption/decryption function. In addition, the PDCP may have a data integrity protection/integrity verification function. In addition, the PDCP may have a re-ordering function. In addition, the PDCP may have a PDCP SDU retransmission function. In addition, the PDCP may have a function of discarding data using a discard timer. In addition, the PDCP may have a multiplexing (duplication) function. In addition, the PDCP may have a function of discarding redundantly received data. A PDCP entity is a bi-directional entity and may be configured of a transmitting PDCP entity and a receiving PDCP entity. In addition, a PDCP PDU format used in the E-UTRA PDCP may be different from a PDCP PDU format used in the NR PDCP. In addition, the PDCP PDU may include a data PDCP PDU and a control PDCP PDU. The data PDCP PDU may be called a PDCP data PDU. In addition, the control PDCP PDU may be called a PDCP control PDU.

Further, in sidelink, there are following restrictions on the functions and services of the PDCP.

(1) Out-of-order delivery may be supported only by unicast transmission.

(2) Multiplexing on the PC5 interface is not supported.

An example of functions of the SDAP will be described. The SDAP is a service data adaptation protocol layer. In sidelink, the SDAP may have a function of mapping a sidelink QoS flow transmitted from a terminal apparatus to another terminal apparatus to a sidelink data radio bearer (DRBs). In addition, the SDAP may have a function of storing mapping rule information. In addition, the SDAP may have a function of marking a QoS flow identifier (QoS Flow ID or QFI). Further, examples of SDAP PDU may include an SDAP PDU for data and an SDAP PDU for control. The SDAP PDU for data may be called an SDAP data PDU. In addition, the SDAP PDU for control may be called an SDAP control PDU. Further, in sidelink, there may be one SDAP entity of a terminal apparatus per destination in any one of unicast transmission, groupcast transmission, and broadcast transmission associated with the destination. In addition, reflective QoS is not supported on the PC5 interface.

An example of functions of the RRC will be described. The RRC may support services and functions on the PC5 interface, such as forwarding of PC5-RRC messages between peer pieces of UE, maintenance and release of PC5-RRC connections between two pieces of UE, and detection of sidelink radio link failure for PC5-RRC connections. A PC5-RRC connection is considered to be a logical connection between two pieces of UE corresponding to a pair of a source L2TD and a destination L2TD and established after a corresponding PC5 unicast link is established. In addition, a PC5-RRC connection corresponds to the PC5 unicast link one-to-one. In addition, UE may have multiple PC5-RRC connections for one or multiple pieces of UE for different pairs of source L2TD and destination L2ID. A separate PC5-RRC procedure and message may be used for UE to transfer UE capability and sidelink configuration to peer UE. In addition, both of peer UE may exchange their UE capabilities and sidelink configurations with each other using separate bi-directional procedures. In a case that sidelink transmission is not of interest, a case that sidelink radio link failure is detected for a PC5-RRC connection, and a case that the layer 2 link release procedure is completed, the UE releases the PC5-RRC connection.

Figure 4:
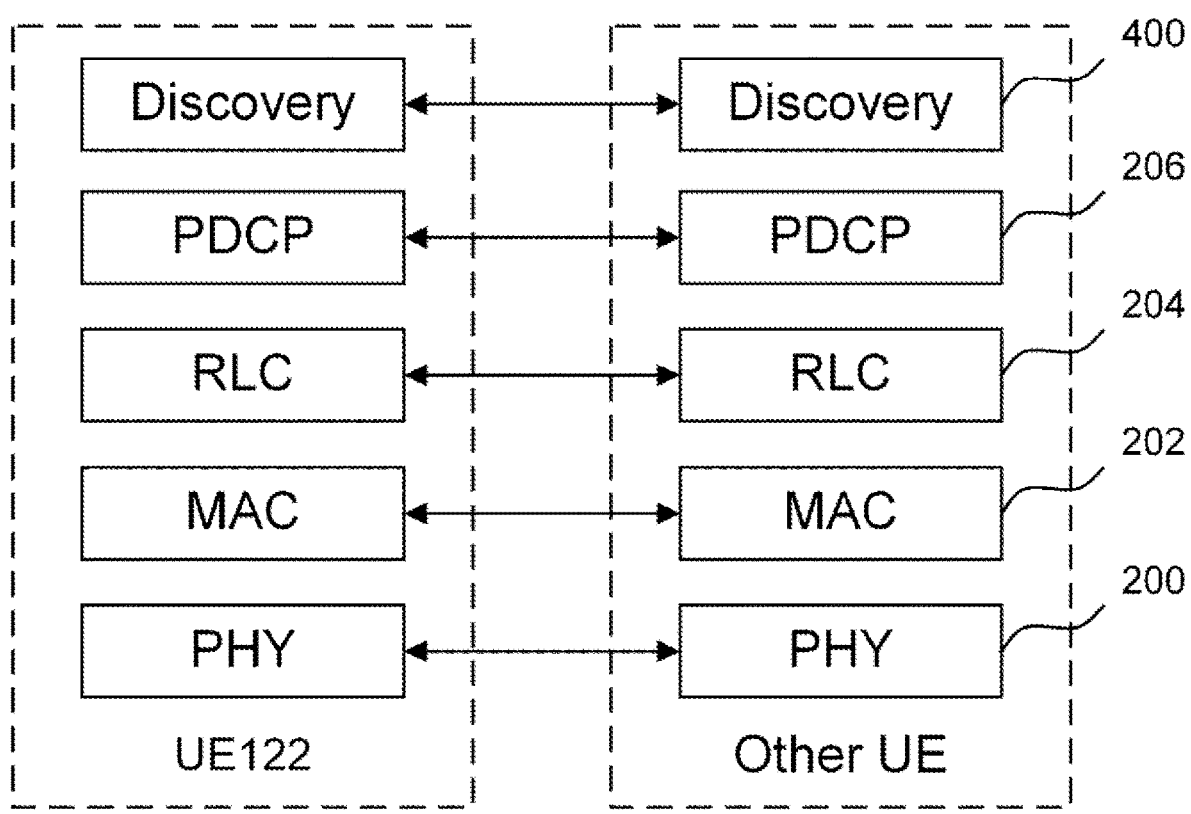
FIG. 4 is a diagram illustrating an example of a protocol architecture of sidelink according to the present embodiment.

A terminal apparatus capable of performing sidelink communication may perform discovery. The discovery includes Model A and Model B. FIG. 4 illustrates a protocol stack in a discovery procedure. Model A may use a single discovery protocol message and Model B may use two discovery protocol messages. A single discovery protocol message in Model A may be an announcement message, and a discovery protocol message in Model B may be a solicitation message and a response message. An outline of the procedures of Model A and Model B in ProSe Direct Discovery will be described below.

In Model A, UE that transmits an announcement message may be referred to as announcing UE, and UE that monitors an announcement message may be referred to as monitoring UE. An announcement message may include information such as a discovery message type, a ProSe application code or a ProSe restricted code, or a security protection element, and may further include metadata information. The announcement message is transmitted by using a destination layer-2 ID (L2ID) and a source layer-2 ID (L2ID), and the monitoring UE determines the destination L2ID to receive the announcement message. Further, the destination L2ID may be a layer-2 identifier of the destination UE, and the source L2ID may be a layer-2 identifier of the source UE. The destination UE may be simply referred to as a destination.

In Model B, UE that transmit an invitation message may be referred to as discoverer UE, and UE that receives an invitation message and/or UE that transmits a response message to discoverer UE may be referred to as discoveree UE. The invitation message may include information such as the type of the discovery message, a ProSe query code, and a security protection element. The invitation message is transmitted by using a destination L2ID and a source L2ID, and the discoveree UE determines the destination L2ID to receive an invitation message. In addition, the discoveree UE responding to the invitation message transmits a response message. The response message may include information such as the type of the discovery message, a ProSe response code, or a security protection element, and may further include metadata information. The response message is transmitted using the source L2ID, and the destination L2ID is set for the source L2ID of the received invitation message.

In discovery, there may be a type other than ProSe Direct Discovery in which another UE is discovered in order to perform direct communication with the other UE, and group member discovery in which one or more pieces of UE are discovered in order to perform communication within a group using sidelink, 5G ProSe UE-to-Network Relay Discovery in which candidate relay UE is discovered in order to connect to a network via relay UE, and the like. Further, although the above-described types of discovery are examples of discovery provided by an application called ProSe, in addition to the above-described types, different types of discovery may be present according to an application or service to perform sidelink communication. In addition, information included in the discovery protocol message may vary according to the type of discovery, and an additional message may be transmitted to transmit additional information.

FIG. 4 is a diagram illustrating an example of a protocol architecture including a discovery protocol according to the present embodiment. As illustrated in FIG. 4, the control plane protocol stack for the SBCCH may include a physical layer (PHY) 200 that is a radio physical layer, a medium access control (MAC) 202 that is a medium access control layer, radio link control (RLC) 204 that is a radio link control layer, and discovery 400 that is a discovery protocol layer. The discovery 400 may be a protocol used to handle procedures related to discovery. In addition, an interface between pieces of UE that perform discovery may be referred to as PC5-D.

A plurality of resource pools for transmitting a discovery message may be configured, and one or multiple resource pools may be configured only for discovery. In a case that a discovery-dedicated resource pool is configured, the UE may use the discovery-dedicated resource pool as a resource pool for transmitting a discovery message, and in a case that no discovery-dedicated resource pool is configured, the UE may use a resource pool for sidelink communication as a resource pool for transmitting a discovery message. Further, multiple resource pools for sidelink communication and resource pools dedicated to discovery may be configured at the same time. Each resource pool may be configured by UE-dedicated signaling or may be configured in advance.

In each unicast PC5-RRC connection, a sidelink signaling radio bearer (SRB) may be configured. A sidelink SRB used to transmit a PC5-S message before PC5-S security is established may be referred to as SL-SRB0. In addition, a sidelink SRB used to transmit a PC5-S message before to establish PC5-S security may be referred to as SL-SRB1. In addition, a sidelink SRB used to transmit a protected PC5-S message after PC5-S security is established may be referred to as SL-SRB2. In addition, a sidelink SRB used to transmit protected PC5-RRC signaling after PC5-S security is established may be referred to as SL-SRB3. In addition, a sidelink SRB used to transmit and/or receive a discovery message in NR may be referred to as SL-SRB4. Further, PC5-RRC signaling may be RRC signaling between UE, which is transmitted and/or received on PC5.

A multi-path relay or multi-path relaying will be described. A multipath relay may be a technique in which a terminal apparatus communicates with a base station apparatus by using two paths of a direct path and an indirect path. The direct path may be a path through which a terminal apparatus directly communicates with a base station apparatus via a Uu interface. In addition, the indirect path may be a path through which a terminal apparatus communicates with a base station apparatus via a relay terminal apparatus. The interface between the terminal apparatus and the relay terminal apparatus may be a PC5 interface or a different interface. In addition, the relay terminal apparatus may be a terminal apparatus serving as U2N relay UE.

In a multi-path relay, a bearer mapped to a direct path may be called a direct bearer, a bearer mapped to an indirect path may be called an indirect bearer, and a bearer mapped to both a direct path and an indirect path may be referred to as a multi-path (MP) split bearer or simply a split bearer.

In the multi-path split bearer, an RLC channel for the Uu interface and an RLC channel for an indirect path may be configured for a PDCP entity of a terminal apparatus having two paths of a direct path and an indirect path. In addition, in a case that the interface between the terminal apparatus and the relay terminal apparatus on an indirect path is a PC5 interface, the RLC channel for the indirect path may be an RLC channel for the PC5 interface. In a case that PDCP duplication is configured for a multi-path split bearer and PDCP duplication is activated, a PDCP entity may duplicate a PDCP DATA PDU to be submitted to a lower layer and submit data to both of the plurality of RLC channels configured for the PDCP entity. A multi-path split bearer may be referred to as a bearer on which a multi-path split bearer is configured. In addition, the multi-path split bearer may be configured as any of data radio bearer and a signaling radio bearer. In addition, in a case that PDCP duplication is not configured on a bearer to be configured with a split bearer (or, PDCP duplication is configured, but is not activated) and a primary path is configured, a PDCP DATA PDU may be submitted to a primary RLC entity configured for a primary path, and in a case that a split secondary RLC entity is configured and the amount of data submitted to a primary RLC entity and the split secondary RLC entity is greater than or equal to a threshold, the PDCP DATA PDU may be submitted to one of the primary RLC entity and the split secondary RLC entity.

Here, a UE-to-Network (U2N) relay used in communication on an indirect path will be described. The U2N relay may be a function of providing connectivity to a network for a remote terminal apparatus (remote UE). The remote terminal apparatus that connects to a network by using a U2N relay may be referred to as U2N remote UE. In addition, a terminal apparatus that provides network connectivity to the U2N remote UE may be referred to as a U2N relay terminal apparatus (relay UE), or simply as a relay terminal apparatus (relay UE). The U2N relay UE may use the Uu interface for communication with the base station apparatus, and may use a PC5 interface in communication with the U2N remote UE. In addition, for the U2N relay, there may be a layer-2 (L2) U2N relay, a layer-3 (L3) U2N relay, and the like. A remote terminal apparatus in the L2 U2N relay may be specifically referred to as L2 U2N remote UE, and a relay terminal apparatus in the L2 U2N relay may be specifically referred to as L2 U2N relay UE. In addition, in the L2 U2N relay, there may be SRAP (SRAP layer) 600 that is a sidelink relay adaptation protocol (SRAP) layer. Further, the SRAP 600 may be simply expressed as SRAP.

Figure 6:
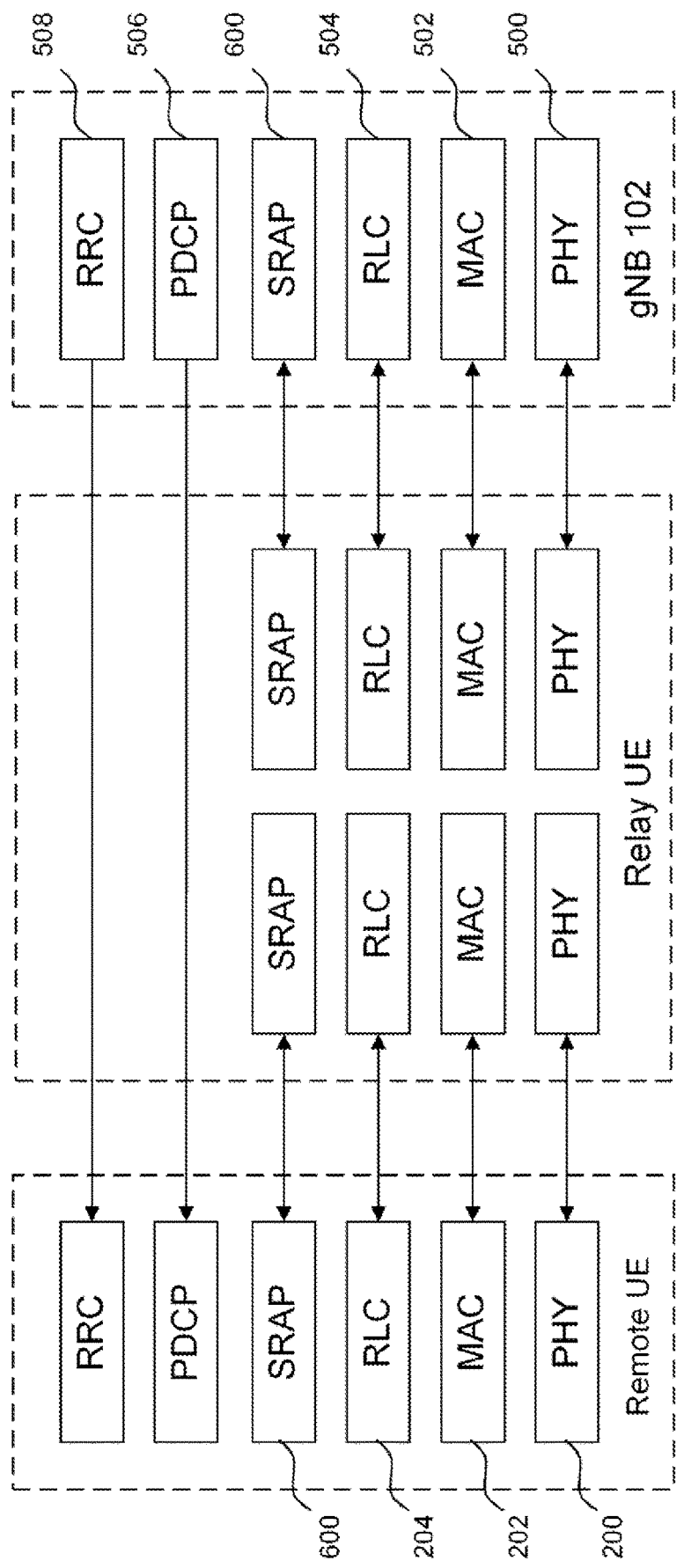
FIG. 6 is a diagram illustrating an example of a protocol architecture of sidelink relaying according to the present embodiment.
Figure 7:
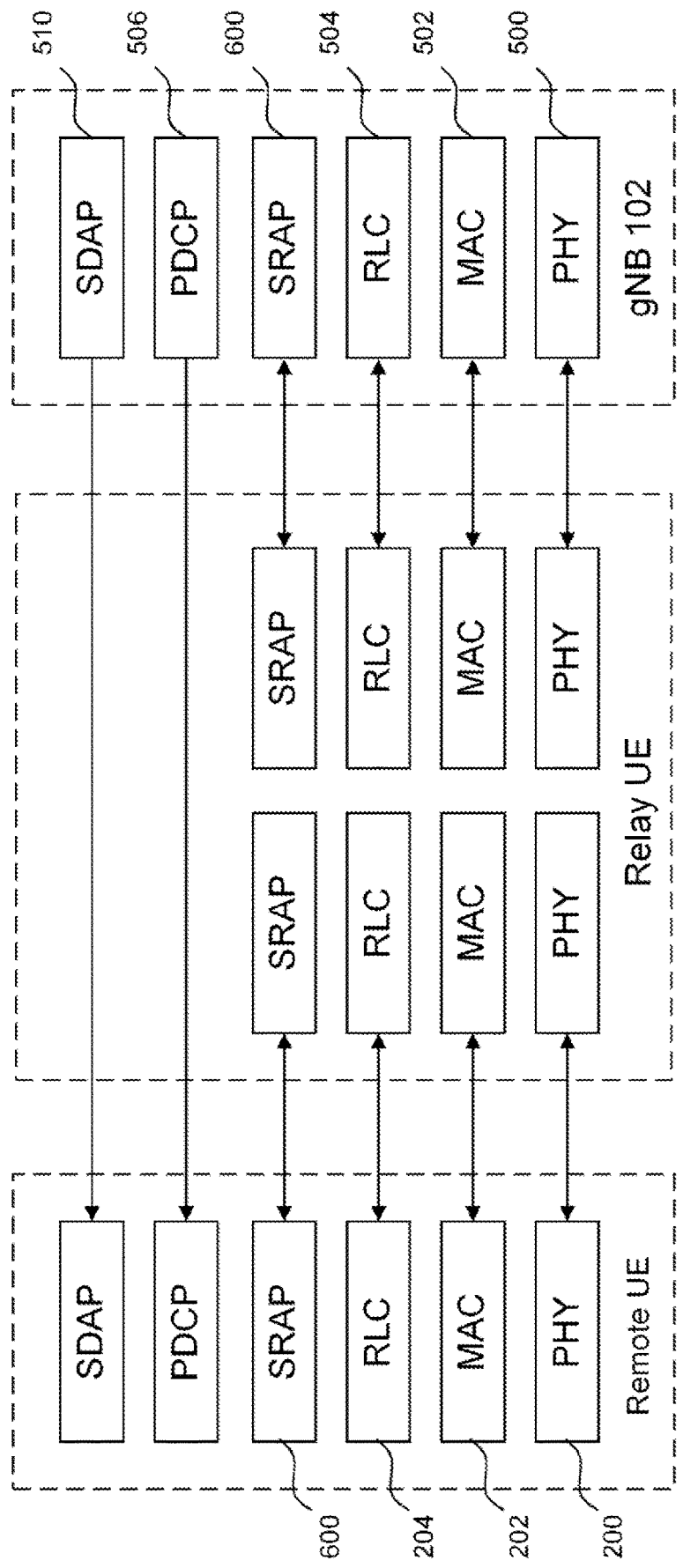
FIG. 7 is a diagram illustrating an example of a protocol architecture of sidelink relaying according to the present embodiment.

FIG. 6 is a diagram illustrating an example of a protocol architecture of a control plane (C-plane) including an SRAP layer according to the present embodiment. In addition, FIG. 7 is a diagram illustrating an example of a protocol architecture of a user plane (U-plane) including an SRAP layer according to the present embodiment. As illustrated in FIGS. 6 and 7, the SRAP layer may be associated between remote UE and relay UE, and may also be associated between the relay UE and the gNB 102. Further, the gNB 102 illustrated in FIGS. 6 and 7 may be the ng-eNB 100. In addition, the remote UE or the relay UE may be the UE 122.

Now, the SRAP will be described. The SRAP may be called a SRAP sublayer. The SRAP sublayer may be above the RLC sublayer for the control and user planes of both the PC5 and Uu interfaces. The SRAP sublayer on the PC5 may be used for the purpose of bearer mapping. For the L2 U2N Relay UE, the SRAP sublayer may include one SRAP entity on the Uu interface, and may include a SRAP entity separate-collocated on the PC5 interface. For the L2 U2N remote UE, the SRAP sublayer may include only one SRAP entity on the PC5 interface. An SRAP entity associated between the remote UE and the relay UE via the PC5 interface may be specifically referred to as PC5-SRAP, and an SRAP entity associated between the relay UE and the gNB via the Uu interface may be specifically referred to as Uu-SRAP. Each SRAP entity may have a transmitter and a receiver. On the PC5 interface, the transmitter of the SRAP entity of the L2 U2N remote UE may be associated with the receiver of the SRAP entity of the L2 U2N relay UE, and the receiver of the SRAP entity of the L2 U2N remote UE may be associated with the transmitter of the SRAP entity of the L2 U2N relay UE. In addition, on the Uu interface, the transmitter of the SRAP entity of the L2 U2N relay UE may be associated with the receiver of the SRAP entity of the gNB 102, and the receiver of the SRAP entity of the L2 U2N relay UE may be associated with the transmitter of the SRAP entity of the gNB 102.

In addition, the SRAP entity may have the functions of forwarding data, determining the UE ID and bearer ID fields of the SRAP header to be added to a data packet, determining an egress link, and determining an egress RLC channel.

In addition, in FIGS. 6 and 7, a PC5 relay RLC channel may be configured between the remote UE and the relay UE, and a Uu relay RLC channel may be configured between the relay UE and the gNB 102.

Next, a protocol architecture used between a base station apparatus and a terminal apparatus will be described. In communication performed on the Uu interface between the terminal apparatus and the base station apparatus, that is, communication on a direct path, communication performed via the relay terminal apparatus configured on an indirect path, and communication performed on the Uu interface between the relay terminal apparatus and the base station apparatus, a protocol used between the base station apparatus and the terminal apparatus may be used.

Figures 5A, 5B:
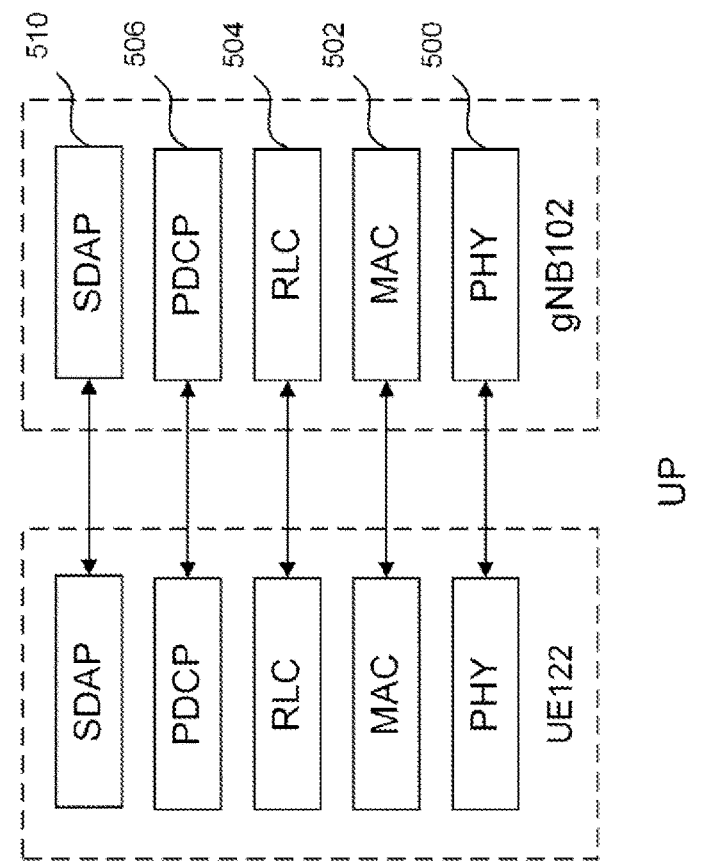
FIGS. 5A and 5B are diagrams illustrating an example of a protocol architecture of a terminal apparatus according to the present embodiment.

FIGS. 5A and 5B are diagrams illustrating an example of an NR protocol architecture according to the present embodiment. Functions of the protocols described with reference to FIGS. 5A and 5B are diagrams are some functions closely related to the present embodiment, and other functions may be included. Further, in the present embodiment, uplink (UL) may be a link from a terminal apparatus to a base station apparatus. In addition, in the present embodiment, downlink (DL) may be a link from a base station apparatus to a terminal apparatus.

FIG. 5A is a diagram illustrating an NR control plane (CP) protocol stack. As illustrated in FIG. 5A, the NR CP protocol may be a protocol between the UE 122 and the gNB 102. That is, the NR CP protocol may be a protocol for termination at the gNB 102 on the network side. As illustrated in FIG. 5A, the NR control plane protocol stack may include a physical layer (PHY) 500 which is a radio physical layer, medium access control (MAC) 502 which is a medium access control layer, radio link control (RLC) 504 which is a radio link control layer, a packet data convergence protocol (PDCP) 506 which is a packet data convergence protocol layer, and radio resource control (RRC) 508 which is a radio resource control layer. In addition, FIG. 5B is a diagram illustrating an NR user plane (UP) protocol stack. As illustrated in FIG. 5B, the NR UP protocol may be a protocol between the UE 122 and the gNB 102. That is, the NR UP protocol may be a protocol for termination at the gNB 102 on the network side. As illustrated in FIG. 5B, the NR user plane protocol stack may include PHY 500 which is a radio physical layer, MAC 502 which is a medium access control layer, RLC 504 which is a radio link control layer, a PDCP 506 which is a packet data convergence protocol layer, and a service data adaptation protocol (SDAP) 510 which is a service data adaptation protocol layer.

Further an access stratum (AS) layer may be a layer that terminates between the UE 122 and the gNB 102. That is, the AS layer may be a layer including some or all of the PHY 500, the MAC 502, the RLC 504, the PDCP 506, and the RRC 508. In addition, the gNB 102 may be the ng-eNB 100. In addition, although only the NR protocol is shown, the E-UTRA protocol may be used. In the E-UTRA protocol, the SDAP 510 may not be present, and the E-UTRA protocol may have some different functions from the NR protocol.

Further, in the present embodiment, terms such as PHY (PHY layer), MAC (MAC layer), RLC (RLC layer), PDCP (PDCP layer), and RRC (RRC layer), may be used without distinguishing the E-UTRA protocol from the NR protocol below. In this case, PHY (PHY layer), MAC (MAC layer), RLC (RLC layer), PDCP (PDCP layer), and RRC (RRC layer) may be PHY (PHY layer), MAC (MAC layer), RLC (RLC layer), PDCP (PDCP layer), and RRC (RRC layer) of the E-UTRA protocol, and PHY (PHY layer), MAC (MAC layer), RLC (RLC layer), PDCP (PDCP layer), and RRC (RRC layer) of the NR protocol, respectively. In addition, the SDAP (SDAP layer) may be the SDAP (SDAP layer) of the NR protocol.

In addition, in order to distinguish the E-UTRA protocol from the NR protocol in the present embodiment below, the PHY 500, the MAC 502, the RLC 504, the PDCP 506, and the RRC 508 may be respectively called PHY for E-UTRA or PHY for LTE, MAC for E-UTRA or MAC for LTE, RLC for E-UTRA or RLC for LTE, PDCP for E-UTRA or PDCP for LTE, and RRC for E-UTRA and RRC for LTE. In addition, the PHY 500, the MAC 502, the RLC 504, the PDCP 506, and the RRC 508 may be respectively described as E-UTRA PHY or LTE PHY, E-UTRA MAC or LTE MAC, E-UTRA RLC or LTE RLC, E-UTRA PDCP or LTE PDCP, and E-UTRA RRC or LTE RRC, and the like. In addition, in a case that the E-UTRA protocol is to be distinguished from the NR protocol, the PHY 500, the MAC 502, the RLC 504, the PDCP 506, and the RRC 508 may be called PHY for NR, MAC for NR, RLC for NR, PDCP for NR, and RRC for NR, respectively. In addition, the PHY 500, the MAC 502, the RLC 504, the PDCP 506, and the RRC 508 may be described as NR PHY, NR MAC, NR RLC, NR PDCP, NR RRC, and the like, respectively.

Entities in the AS layer of E-UTRA and/or NR will now be described. An entity having some or all of the functions of the physical layer may be called a PHY entity. An entity having some or all of the functions of the MAC layer may be called a MAC entity. An entity having some or all of the functions of the RLC layer may be called an RLC entity. An entity having some or all of the functions of the PDCP layer may be called a PDCP entity. An entity having some or all of the functions of the SDAP layer may be referred to as an SDAP entity. An entity having some or all of the functions of the RRC layer may be called an RRC entity. A PHY entity, a MAC entity, an RLC entity, a PDCP entity, an SDAP entity, and an RRC entity may be rephrased as PHY, MAC, RLC, PDCP, SDAP, and RRC, respectively.

Further, data provided to a lower layer from the MAC, RLC, PDCP, and SDAP and/or data provided from a lower layer to the MAC, RLC, PDCP, and SDAP may be called a MAC protocol data unit (PDU), an RLC PDU, a PDCP PDU, and an SDAP PDU, respectively. In addition, data provided from a higher layer to the MAC, RLC, PDCP, and SDAP, and/or data provided to a higher layer from the MAC, RLC, PDCP, and SDAP may be called a MAC service data unit (SDU), an RLC SDU, a PDCP SDU, and an SDAP SDU, respectively. In addition, a segmented RLC SDU is called an RLC SDU segment.

Here, the base station apparatus and the terminal apparatus exchange (transmit and/or receive) signals with each other in a higher layer. A higher layer may be referred to as an upper layer, and they may be paraphrased with each other. For example, in the radio resource control (RRC) layer, the base station apparatus and the terminal apparatus may transmit and/or receive an RRC message (which is also referred to as RRC signaling). In addition, the base station apparatus and the terminal apparatus may transmit and/or receive a medium access control (MAC) control element in the medium access control (MAC) layer. In addition, the RRC layer of the terminal apparatus acquires system information broadcast from the base station apparatus. Here, the RRC message, the system information, and/or the MAC control element are also referred to as higher layer signaling or a higher layer parameter. Each of parameters included in the higher layer signaling received by the terminal apparatuses may be referred to as a higher layer parameter. For example, since a higher layer in processing of the PHY layer means a higher layer as viewed from the PHY layer, it may mean one or multiple of the MAC layer, the RRC layer, the RLC layer, the PDCP layer, a Non Access Stratum (NAS) layer, or the like. For example, a higher layer in processing of the MAC layer may mean one or multiple of the RRC layer, the RLC layer, the PDCP layer, the NAS layer, or the like.

Hereinafter, "A is given (provided) in a higher layer" or "A is given (provided) by a higher layer" may mean that a higher layer (mainly the RRC layer, the MAC layer, or the like) of the terminal apparatus receives A from the base station apparatus and the received A is given (provided) from the higher layer of the terminal apparatus to the physical layer of the terminal apparatus. For example, "being provided with a higher layer parameter" to the terminal apparatus may mean that higher layer signaling is received from the base station apparatus and the higher layer parameter included in the received higher layer signaling is provided from the higher layer of the terminal apparatus to the physical layer of the terminal apparatus. Configuring a higher layer parameter to the terminal apparatus may mean that a higher layer parameter is given (provided) to the terminal apparatus. For example, configuring a higher layer parameter to the terminal apparatus may mean that the terminal apparatus receives higher layer signaling from the base station apparatus and configures the received higher layer parameter in the higher layer. However, configuring a higher layer parameter to the terminal apparatus may mean that a pre-given default parameter is configured to the higher layer of the terminal apparatus. To describe transmission of an RRC message from the terminal apparatus to the base station apparatus, the expression that a message is submitted from an RRC entity of the terminal apparatus to a lower layer may be used. "Submitting a message to a lower layer" in a terminal apparatus from an RRC entity may mean that a message is submitted to the PDCP layer. "Submitting a message to a lower layer" in a terminal apparatus from the RRC layer may mean that the message from the RRC is submitted to a PDCP entity corresponding to each SRB (SRB0, SRB1, SRB2, SRB3, etc.) since the message is transmitted using an SRB. When the RRC entity of the terminal apparatus receives an indication from a lower layer, the lower layer may mean one or more of the PHY layer, MAC layer, RLC layer, PDCP layer, and the like.

An example of the functions of the PHY will be described. The PHY of the terminal apparatus may have a function of receiving data transmitted from the PHY of the base station apparatus via a downlink (DL) physical channel. The PHY of the terminal apparatus may have a function of transmitting data to the PHY of the base station apparatus via an uplink (UL) physical channel. The PHY may be connected to the MAC of a higher layer via a transport channel. The PHY may exchange data with the MAC via the transport channel. In addition, the PHY may be provided with data from the MAC via the transport channel. In the PHY, a radio network temporary identifier (RNTI) may be used in order to identify various pieces of control information.

Now, physical channels will be described. Examples of physical channels used in radio communication between the terminal apparatus and the base station apparatus may include the following physical channels.

Physical broadcast channel (PBCH)
Physical downlink control channel (PDCCH)
Physical downlink shared channel (PDSCH)
Physical uplink control channel (PUCCH)
Physical uplink shared channel (PUSCH)
Physical random access channel (PRACH)

The PBCH may be used to broadcast system information required by the terminal apparatus.

In addition, the PBCH may be used to broadcast time indexes (SSB-Indexes) within the cycle of synchronization signal blocks (SSB) in NR.

The PDCCH may be used to transmit (or carry) downlink control information (DCI) in downlink radio communication (radio communication from the base station apparatus to the terminal apparatus). Here, one or multiple pieces of DCI (which may also be referred to as DCI formats) may be defined for transmission of downlink control information. In other words, a field for the downlink control information may be defined as DCI and mapped to information bits. The PDCCH may be transmitted in a PDCCH candidate. The terminal apparatus may monitor a set of PDCCH candidates in a serving cell. Monitoring of a set of PDCCH candidates may mean that decoding of the PDCCH is attempted in a certain DCI format. In addition, the terminal apparatus may monitor the PDCCH candidates in monitoring occasions configured in one or more configured control resource sets (CORESET) configured in a search space configuration. The certain DCI format may be used for scheduling of the PUSCH in the serving cell. The PUSCH may be used for transmission of user data, transmission of RRC messages, which will be described below, and the like.

PDCCH repetition may be operated by using two search space sets explicitly linked by a configuration provided by a higher layer (RRC layer). In addition, the two linked search space sets may be associated with a corresponding CORESET. For PDCCH repetition, two linked search space sets may be configured for the terminal apparatus together with the same number of PDCCH candidates. Two PDCCH candidates in two linked search space sets may be linked by the same candidate index. When PDCCH repetition is scheduled to the terminal apparatus, inter-slot repetition may be allowed, and each repetition operation may have the same number of control channel elements (CCEs), coded bits and the same DCI payload.

The PUCCH may be used to transmit uplink control information (UCI) in uplink radio communication (radio communication from the terminal apparatus to the base station apparatus). Here, the uplink control information may include channel state information (CSI) used to indicate a downlink channel state. In addition, the uplink control information may include a scheduling request (SR) used to request uplink shared channel (UL-SCH) resources. In addition, the uplink control information may include a hybrid automatic repeat request acknowledgement (HARQ-ACK).

The PDSCH may be used to transmit downlink data (downlink shared channel or DL-SCH) from the MAC layer. In addition, the PDSCH may be used in downlink to transmit system information (SI), a random access response (RAR), and the like.

The PUSCH may be used to transmit uplink data (uplink shared channel or UL-SCH) from the MAC layer or to transmit a HARQ-ACK and/or CSI along with the uplink data. In addition, the PUSCH may be used to transmit CSI only or a HARQ-ACK and CSI only. In other words, the PUSCH may be used to transmit UCI only. In addition, the PDSCH or PUSCH may be used to transmit RRC message and a MAC CE, which will be described below. Here, in the PDSCH, an RRC message transmitted from the base station apparatus may be signaling common to multiple terminal apparatuses within a cell. In addition, the RRC message transmitted from the base station apparatus may be dedicated signaling to a certain terminal apparatus. In other words, terminal apparatus-specific (UE-specific) information may be transmitted by using dedicated signaling to a certain terminal apparatus. In addition, the PUSCH may be used to transmit UE capability in uplink.

The PRACH may be used to transmit a random access preamble. The PRACH may be used to indicate an initial connection establishment procedure, a handover procedure, a connection re-establishment procedure, synchronization (timing adjustment) with uplink transmission, and a request for UL-SCH resources.

An example of functions of the MAC will be described. The MAC may be called a MAC sublayer. The MAC may have a function of mapping various logical channels to corresponding transport channels. The logical channels may be identified with a logical channel identifier (logical channel identity, or logical channel ID). The MAC may be connected to the RLC of a higher layer via a logical channel. The logical channels may be classified into a control channel for transmitting control information and a traffic channel for transmitting user information depending on the type of information to be transmitted. In addition, the logical channels may be divided into uplink logical channel and downlink logical channels. The MAC may have a function of multiplexing MAC SDUs belonging to one or more different logical channels and providing the multiplexed MAC SDUs to the PHY. In addition, the MAC may have a function of demultiplexing a MAC PDU provided from the PHY and providing the demultiplexed MAC PDU to a higher layer through a logical channel to which each MAC SDU belongs. Furthermore, the MAC may have a function of performing error correction through a hybrid automatic repeat request (HARQ). In addition, the MAC may also have a function of reporting scheduling information. The MAC may have a function of performing priority processing between terminal apparatuses by using dynamic scheduling. In addition, the MAC may have a function of performing priority processing between logical channels within one terminal apparatus. The MAC may have a function of performing priority processing of overlapping resources within one terminal apparatus. The E-UTRA MAC may have a function of identifying multimedia broadcast multicast services (MBMS). In addition, NR MAC has the function of identifying multicast and broadcast services (MBS). The MAC may have a function of selecting a transport format. The MAC may have a function of performing discontinuous reception (DRX) and/or discontinuous transmission (DTX), a function of performing a random access (RA) procedure, a power headroom report (PHR) function of giving notification of information about transmittable power, a buffer status report (BSR) function of giving notification of information about a data amount of a transmission buffer, and the like. The NR MAC may have a bandwidth adaptation (BA) function. In addition, a MAC PDU format used in the E-UTRA MAC may be different from a MAC PDU format used in the NR MAC. In addition, the MAC PDU may include a MAC control element (MAC CE) which is an element for performing control over the MAC.

Uplink (UL) and/or downlink (DL) logical channels used in E-UTRA and/or NR will be described.

A broadcast control channel (BCCH) may be a downlink logical channel for broadcasting control information, such as system information (SI).

A paging control channel (PCCH) may be a downlink logical channel for carrying a paging message.

A common control channel (CCCH) may be a logical channel for transmitting control information between the terminal apparatus and the base station apparatus. The CCCH may be used in a case that the terminal apparatus does not have an RRC connection. In addition, the CCCH may be used between the base station apparatus and multiple terminal apparatuses.

A dedicated control channel (DCCH) may be a logical channel for transmitting dedicated control information in a point-to-point bi-directional manner between the terminal apparatus and the base station apparatus. The dedicated control information may be control information dedicated to each terminal apparatus. The DCCH may be used in a case that the terminal apparatus has an RRC connection.

A dedicated traffic channel (DTCH) may be a logical channel for transmitting user data in a point-to-point manner between the terminal apparatus and the base station apparatus. The DTCH may be a logical channel for transmitting dedicated user data. The dedicated user data may be user data dedicated to each terminal apparatus. The DTCH may be present in both uplink and downlink.

Mapping between a logical channel and a transport channel in uplink in E-UTRA and/or NR will be described.

The CCCH may be mapped to the uplink shared channel (UL-SCH) that is an uplink transport channel.

The DCCH may be mapped to the uplink shared channel (UL-SCH) that is an uplink transport channel.

The DTCH may be mapped to the uplink shared channel (UL-SCH) that is an uplink transport channel.

Mapping between a logical channel and a transport channel in downlink in E-UTRA and/or NR will be described.

The BCCH may be mapped to a broadcast channel (BCH) and/or a downlink shared channel (DL-SCH) that are downlink transport channels.

The PCCH may be mapped to a paging channel (PCH) that is a downlink transport channel.

The CCCH may be mapped to the downlink shared channel (DL-SCH) that is a downlink transport channel.

The DCCH may be mapped to the downlink shared channel (DL-SCH) that is a downlink transport channel.

The DTCH may be mapped to the downlink shared channel (DL-SCH) that is a downlink transport channel.

An example of functions of the RLC will be described. The RLC may be called an RLC sublayer. The E-UTRA RLC may have a function of segmenting and/or concatenating data provided from the PDCP of a higher layer and providing the data to a lower layer. The E-UTRA RLC may have a function of performing reassembling and re-ordering data provided from a lower layer and providing the data to a higher layer. The NR RLC may have a function of giving a sequence number independent of the sequence number added by the PDCP of a higher layer to the data provided from the PDCP. In addition, the NR RLC may have a function of segmenting data provided from the PDCP and providing the data to a lower layer. In addition, the NR RLC may have a function of reassembling data provided from a lower layer and providing the data to a higher layer. In addition, the RLC may have a data retransmission function and/or a retransmission request function (automatic repeat request or ARQ). In addition, the RLC may have a function of performing error correction by using ARQ. Control information indicating data that needs to be retransmitted, which is transmitted from the reception side to the transmission side of the RLC in order to perform ARQ, may be referred to as a status report. In addition, an indication of transmission of status report transmitted from the transmission side to the reception side of the RLC is referred to as a poll. In addition, the RLC may have a function of detecting data duplication. In addition, the RLC may have a function of data discard. The RLC may have three modes of a transparent mode (TM), an unacknowledged mode (UM), and an acknowledged mode (AM). In the TM, data received from a higher layer is not segmented, and no RLC header is not added. A TM RLC entity is a uni-directional entity and may be configured as a transmitting TM RLC entity or a receiving TM RLC entity. Although data received from a higher layer is segmented and/or concatenated, an RLC header is added, and the like in the UM, retransmission control of data is not performed. A UM RLC entity may be a uni-directional entity or a bi-directional entity. In a case that a UM RLC entity is a uni-directional entity, the UM RLC entity may be configured as a transmitting UM RLC entity or a receiving UM RLC entity. In a case that a UM RLC entity is a bi-directional entity, the UM RRC entity may be configured as a UM RLC entity configured in a transmitting side and a receiving side. In the AM, data received from a higher layer may be segmented and/or concatenated, an RLC header may be added, retransmission control of data is performed, and the like. An AM RLC entity is a bi-directional entity and may be configured as an AM RLC configured in a transmitting side and a receiving side. Further, data provided to a lower layer and/or data provided from a lower layer in the TM may be called a TMD PDU. In addition, data provided to a lower layer and/or data provided from a lower layer in the UM may be called a UMD PDU. In addition, data provided to a lower layer and/or data provided from a lower layer in the AM may be called an AMD PDU. An RLC PDU format used in the E-UTRA RLC may be different from an RLC PDU format used in the NR RLC. In addition, the RLC PDU may include a data RLC PDU and a control RLC PDU. The data RLC PDU may be called an RLC data PDU. In addition, control RLC PDU may be called an RLC control PDU.

An example of functions of the PDCP will be described. The PDCP may be called a PDCP sublayer. The PDCP may have a function of maintaining sequence numbers. In addition, the PDCP may have a header compression/decompression function for efficiently transmitting user data such as IP packets, Ethernet frames, and the like over a radio section. A protocol used for header compression/decompression of an IP packet may be called a robust header compression (ROHC) protocol. In addition, a protocol used for Ethernet (registered trademark) frame header compression/decompression may be called an Ethernet Header Compression (EHC) protocol. In addition, the PDCP may have a data encryption/decryption function. In addition, the PDCP may have a data integrity protection/integrity verification function. In addition, the PDCP may have a re-ordering function. In addition, the PDCP may have a PDCP SDU retransmission function. In addition, the PDCP may have a function of discarding data using a discard timer. In addition, the PDCP may have a multiplexing (duplication) function. In addition, the PDCP may have a function of discarding redundantly received data. A PDCP entity is a bi-directional entity and may be configured of a transmitting PDCP entity and a receiving PDCP entity. In addition, a PDCP PDU format used in the E-UTRA PDCP may be different from a PDCP PDU format used in the NR PDCP. In addition, the PDCP PDU may include a data PDCP PDU and a control PDCP PDU. The data PDCP PDU may be called a PDCP data PDU. In addition, the control PDCP PDU may be called a PDCP control PDU.

An example of functions of the SDAP will be described. The SDAP is a service data adaptation protocol layer. The SDAP may have a function of mapping a QoS flow of downlink transmitted from the 5GC to a terminal apparatus through a base station apparatus to a data radio bearer (DRB), and/or mapping a QoS flow of uplink transmitted from a terminal apparatus to the 5GC through a base station apparatus to a DRB. In addition, the SDAP may have a function of storing mapping rule information. In addition, the SDAP may have a function of marking a QoS flow identifier (QoS Flow ID or QFI). Further, examples of SDAP PDU may include an SDAP PDU for data and an SDAP PDU for control. The SDAP PDU for data may be called an SDAP data PDU. In addition, the SDAP PDU for control may be called an SDAP control PDU. Further, there may be one SDAP entity of the terminal apparatus for a PDU session.

An example of functions of the RRC will be described. The RRC may have a broadcast function. The RRC may have a function of paging from the 5GC. The RRC may have a function of paging from the gNB 102 or the ng-eNB 100. In addition, the RRC may have an RRC connection management function. In addition, the RRC may have a radio bearer control function. In addition, the RRC may have a cell group control function. In addition, the RRC may have a mobility control function. In addition, the RRC may have terminal apparatus measurement reporting and terminal apparatus measurement reporting control functions. In addition, the RRC may have a QoS management function. In addition, the RRC may have radio link failure detection and recovery functions. The RRC may use RRC messages to perform broadcast, paging, RRC connection management, radio bearer control, cell group control, mobility control, terminal apparatus measurement reporting and terminal apparatus measurement reporting control, QoS management, detection and recovery of radio link failure, and the like. Further, an RRC message or parameter used in E-UTRA RRC may be different from an RRC message or parameter used in NR RRC.

An RRC message may be transmitted using the BCCH of a logical channel, may be transmitted using the PCCH of the logical channel, may be transmitted using the CCCH of the logical channel, and may be transmitted using the DCCH of the logical channel In addition, an RRC message transmitted using the DCCH is referred to as dedicated RRC signaling or RRC signaling.

An RRC message transmitted using the BCCH may include, for example, a master Information block (MIB), may include a system information block (SIB) of each type, or may include another RRC message. An RRC message transmitted using the PCCH may include a paging message, or may include another RRC message.

An RRC message transmitted using the CCCH in the uplink (UL) direction may include, for example, an RRC setup request message (RRC Setup Request), an RRC resumption request message (RRC Resume Request), an RRC reestablishment request message (RRC Reestablishment Request), an RRC system information request message (RRC System Info Request), and the like. In addition, for example, an RRC connection request message (RRC Connection Request), an RRC connection resumption request message (RRC Connection Resume Request), an RRC connection reestablishment request message (RRC Connection Reestablishment Request), and the like may be included. Other RRC messages may also be included.

An RRC message transmitted using the CCCH in the downlink (DL) direction may include, for example, an RRC connection rejection message (RRC Connection Reject), an RRC connection setup message (RRC Connection Setup), an RRC connection reestablishment message (RRC Connection Reestablishment), an RRC connection reestablishment rejection message (RRC Connection Reestablishment Reject), and the like. In addition, for example, an RRC rejection message (RRC Reject), an RRC setup message (RRC Setup), and the like may be included. Other RRC messages may also be included.

RRC signaling transmitted using the DCCH in the uplink (UL) direction may include, for example, a measurement report message (Measurement Report), an RRC connection reconfiguration completion message (RRC Connection Reconfiguration Complete), an RRC connection setup completion message (RRC Connection Setup Complete), an RRC connection reestablishment completion message (RRC Connection Reestablishment Complete), a security mode completion message (Security Mode Complete), a UE capability information message (UE Capability Information), and the like. In addition, for example, a measurement report message (Measurement Report), an RRC reconfiguration completion message (RRC Reconfiguration Complete), an RRC setup completion message (RRC Setup Complete), an RRC reestablishment completion message (RRC Reestablishment Complete), an RRC resumption completion message (RRC Resume Complete), a security mode completion message (Security Mode Complete), a UE capability information message (UE Capability Information), and the like may be included. Other RRC signaling may also be included.

RRC signaling transmitted using the DCCH in the downlink (DL) direction may include, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like. In addition, for example, an RRC reconfiguration message (RRC Reconfiguration), an RRC resumption message (RRC Resume), an RRC release message (RRC Release), an RRC reestablishment message (RRC Reestablishment), a security mode command message (Security Mode Command), a UE capability enquiry message (UE Capability Enquiry), and the like may be included. Other RRC signaling may also be included.

The functional of the above-described PHY, MAC, RLC, PDCP, SDAP, and RRC are an example, and some or all of the functions may not be implemented. In addition, some or all of the functions of each layer may be included in another layer.

Next, a state transition of the UE 122 in LTE and NR will be described. The UE 122 connected to an EPC or 5GC may be in an RRC_CONNECTED state in a case that an RRC connection has been established. The state in which an RRC connection has been established may include a state in which the UE 122 retains some or all of UE contexts to be described later. In addition, the state in which an RRC connection has been established may include a state in which the UE 122 can transmit and/or receive unicast data. In addition, the UE 122 may be in the RRC_INACTIVE state when the RRC connection is suspended. In addition, a case that the UE 122 is in the RRC_INACTIVE state is a case that the UE 122 is connected to the 5GC, which may be the time when the RRC connection is suspended. When the UE 122 is neither in the RRC_CONNECTED state nor in the RRC_INACTIVE state, the UE 122 may be in an RRC_IDLE state.

Further, although the UE 122 connected to the EPC does not have the RRC_INACTIVE state, the E-UTRAN may initiate suspension of the RRC connection. In the case that the UE 122 is connected to the EPC, when the RRC connection is suspended, the UE 122 may hold an AS context of the UE and an identifier used for resumption (resume) (resume Identity) to transition to the RRC_IDLE state. A higher layer (e.g., a NAS layer) of the RRC layer of the UE 122 may start resumption of the suspended RRC connection when the UE 122 retains the AS context of the UE, and resumption of the RRC connection is permitted by the E-UTRAN, and that the UE 122 needs to transition from the RRC_IDLE state to the RRC_CONNECTED state.

The definition of suspension may vary between the UE 122 connected to an EPC 104 and the UE 122 connected to a 5GC 110. In addition, a part or all of the procedures of resumption for the UE 122 from suspension may vary between a case that the UE 122 is connected to the EPC (a case that the UE 122 is suspended in the RRC_IDLE state) and a case that the UE 122 is connected to the 5GC (a case that the UE 122 is suspended in the RRC_INACTIVE state).

Further, the RRC_CONNECTED state, the RRC_INACTIVE state, and the RRC_IDLE state may be respectively referred to as a connected state (connected mode), an inactive state (inactive mode), and an idle state (idle mode), or may be respectively referred to as an RRC connected state (RRC connected mode), an RRC inactive state (RRC inactive mode), and an RRC idle state (RRC idle mode).

The AS context of the UE retained by the UE 122 may be information including all or some of a current RRC configuration, a current security context, a PDCP state including a robust header compression (ROHC) state, a cell radio network temporary identifier (C-RNTI) used in a PCell of a connection source, a cell identifier (cell Identity), and a physical cell identifier of the PCell of the connection source. Further, the AS context of the UE retained by one or all of the eNB 100 and the gNB 102 may include information identical to the information of the AS context of the UE retained by the UE 122, or may include information different from the information included in the AS context of the UE retained by the UE 122.

A security context may be information including all or some of an encryption key at the AS level, a next hop parameter (NH), a next hop chaining counter parameter (NCC) used to derive an access key for the next hop, an identifier of an encryption algorithm at a selected AS level, and a counter used for replay protection.

A radio bearer will be described. In a case that a terminal apparatus communicates with a base station apparatus, a wireless connection may be performed by establishing a radio bearer (RB) between the terminal apparatus and the base station apparatus. A radio bearer used in the CP may be called a signaling radio bearer (SRB). In addition, a radio bearer used in the UP may be called a data radio bearer (DRB). A radio bearer identifier (Identity or ID) may be allocated to each radio bearer. A radio bearer identifier for the SRB may be called an SRB identifier (SRB Identity or SRB ID). A radio bearer identifier for the DRB may be called a DRB identifier (DRB Identity or DRB ID). For the SRB of E-UTRA, SRB0 to SRB2 may be defined, and other SRBs may be defined. For the SRB of NR, SRB0 to SRB3 may be defined, and other SRBs may be defined. The SRB0 may be an SRB for RRC messages that are transmitted and/or received using the CCCH of a logical channel. The SRB1 may be an SRB for RRC signaling and for NAS signaling prior to establishment of the SRB2. Piggybacked NAS signaling may be included in the RRC signaling transmitted and/or received using the SRB1. The DCCH of the logical channel may be used for all RRC signaling and NAS signaling transmitted and/or received using the SRB1. The SRB2 may be an SRB for NAS signaling and for RRC signaling including logged measurement information. The DCCH of the logical channel may be used for all RRC signaling and NAS signaling transmitted and/or received using the SRB2. In addition, the SRB2 may have a lower priority than the SRB1. The SRB3 may be an SRB for transmitting and/or receiving specific RRC signaling when EN-DC, NGEN-DC, NR-DC, etc. is configured for the terminal apparatus. The DCCH of the logical channel may be used for all RRC signaling and NAS signaling transmitted and/or received using the SRB3. In addition, other SRBs may be provided for other applications. The DRB may be a radio bearer for user data. The DTCH of the logical channel may be used for the RRC signaling transmitted and/or received using the DRB.

A radio bearer for a terminal apparatus will be described. A radio bearer may include an RLC bearer. An RLC bearer may consist of one or two RLC entities and the logical channel. The RLC entities when there are two RLC entities in the RLC bearer may be TM RLC entity and/or a transmitting RLC entity and a receiving RLC entity for RLC entities in the unidirectional UM mode. The SRB0 may consist of one RLC bearer. An RLC bearer of the SRB0 may consist of a TM RLC entity and a logical channel. The SRB0 may be established in the terminal apparatus at all times in all states (the RRC idle state, the RRC connected state, the RRC inactive state, and the like). One SRB1 may be established and/or configured in the terminal apparatus by RRC signaling received from the base station apparatus when the terminal apparatus transitions from the RRC idle state to the RRC connected state. One SRB1 may consist of one PDCP entity and one or more RLC bearers. An RLC bearer of the SRB1 may consist of an AM RLC entity and a logical channel. One SRB2 may be established and/or configured in the terminal apparatus through RRC signaling received from the base station apparatus by the terminal apparatus in the RRC connected state in which AS security is activated. One SRB2 may consist of one PDCP entity and one or more RLC bearers. An RLC bearer of the SRB2 may consist of an AM RLC entity and a logical channel. Further, the PDCP of the SRB1 and SRB2 on the base station apparatus side may be located in a master node. One SRB3 may be established and/or configured in the terminal apparatus through RRC signaling received from the base station apparatus by the terminal apparatus in the RRC connected state with AS security activated when a secondary node is added or the secondary node is changed in EN-DC, NGEN-DC, or NR-DC. The SRB3 may be a direct SRB between the terminal apparatus and the secondary node. The SRB3 may consist of one PDCP entity and one or more RLC bearers. An RLC bearer of the SRB3 may consist of an AM RLC entity and a logical channel. The PDCP of the SRB3 on the base station apparatus side may be located in the secondary node. One DRB may be established and/or configured in the terminal apparatus through RRC signaling received from the base station apparatus by the terminal apparatus in the RRC connected state in which AS security is activated. The DRB may consist of one PDCP entity and one or more RLC bearers. An RLC bearer of the DRB may consist of an AM or UM RLC entity and a logical channel.

An RLC entity established and/or configured for an RLC bearer established and/or configured in a cell group configured on E-UTRA may be an E-UTRA RLC. In addition, an RLC entity established and/or configured for an RLC bearer established and/or configured in a cell group configured on NR may be an NR RLC. In a case that EN-DC is configured for the terminal apparatus, a PDCP entity established and/or configured for an MN-terminated MCG bearer may be either E-UTRA PDCP or NR PDCP. In addition, in a case that EN-DC is configured for the terminal apparatus, the PDCP established and/or configured for radio bearers of another bearer types, that is, an MN-terminated split bearer, an MN-terminated SCG bearer, an SN-terminated MCG bearer, an SN-terminated split bearer, and an SN-terminated SCG bearer may be the NR PDCP. In addition, in a case that NGEN-DC, NE-DC, or NR-DC is configured for the terminal apparatus, a PDCP entity established and/or configured for all bearer types of radio bearer may be the NR PDCP.

Further, in NR, the DRB established and/or configured for the terminal apparatus may be linked to one PDU session. One SDAP entity may be established and/or configured for one PDU session for the terminal apparatus. An SDAP entity, a PDCP entity, an RLC entity, and the logical channel established and/or configured for the terminal apparatus may be established and/or configured by RRC signaling received by the terminal apparatus from the base station apparatus.

Reference signal received power (RSRP) measured in sidelink may be, for example, the following RSRP. In addition, the following RSRP may be referred to as SL-RSRP.

(a) PSBCH RSRP
(b) PSSCH RSRP
(c) PSCCH RSRP

PSBCH-RSRP (PSBCH RSRP) may be defined as a linear average of power contributions of resource elements carrying a plurality of demodulation reference signals (DMRS) associated with the PSBCH. In addition, PSSCH-RSRP (PSSCH RSRP) may be defined as a linear average of power contributions of resource elements of antenna ports transmitting a plurality of DMRSs associated with the PSSCH, and in a case that there are a plurality of antenna ports, the values of RSRP for the antenna ports may be summed. PSCCH-RSRP (PSCCH RSRP) may be defined as a linear average of power contributions of resource elements carrying a plurality of DMRSs associated with the PSCCH. Further, DMRSs may be used to demodulate, for example, signals of the PSBCH, PSSCH, and PSCCH. In addition, the terminal apparatus may measure RSRP (SD-RSRP) of a discovery message by using the power contribution of the resource element that transmits a DMRS associated with the discovery message.

In addition, in measurement in sidelink, the UE 122 may measure the following quantities in addition to the SL-RSRP.

(a) Sidelink received signal strength indicator (SL RSSI)
(b) Sidelink channel occupancy ratio (SL CR)
(c) Sidelink channel busy ratio (SL CBR)

There are two resource allocation modes in sidelink communication of NR, the mode in which the UE performs sidelink transmission by using resources scheduled by the base station is referred to as mode 1, and the mode in which the UE automatically selects resources to perform sidelink transmission is referred to as mode 2. In mode 1, the UE needs to be in the RRC_CONNECTED state, and in mode 2, the UE is capable of performing sidelink transmission regardless of whether the UE is in the RRC state or on the NG-RAN. Further, in mode 2, the UE automatically selects resources capable of performing sidelink transmission from one or more resource pools configured before sidelink transmission is performed.

Next, radio link failure in sidelink will be described. The terminal apparatus performing sidelink communication may determine that sidelink radio link failure has been detected when any of the following conditions is satisfied.

(a) It has been notified from the sidelink RLC that the number of retransmissions to a specific destination had reached the maximum number.
(b) T400 for a specific destination has expired.
(c) It has been notified by the MAC entity that the number of consecutive HARQ DTXs for a specific destination had reached the maximum number.
(d) Consistency check failure has been notified from a sidelink PDCP entity for SL-SRB2 or SL-SRB3 for a specific destination.

Next, radio link monitoring (RLM) on the Uu will be described.

In the RRC connected state, the terminal apparatus may perform RLM in an active BWP to be described later or a BWP designated as a BWP for performing radio link monitoring. RLM may be performed based on a reference signal (e.g., CRS in E-UTRA, SSB/CSI-RS in NR) and a signal quality threshold. The reference signal may include an SSB. The signal quality threshold may be configured by a network, or a preset threshold may be used. SSB-based RLM may be performed based on an SSB associated with an initial DL BWP to be described below. SSB-based RLM may be configured for an initial DL BWP and one or more DL BWPs including the SSB associated with the initial DL BWP. CSI-RS-based RLM may be performed for other DL BWPs.

In RLM, the terminal apparatus may declare radio link failure (RLF) based on any one of the following criteria (A) to (D) being satisfied.
- (A) A radio problem timer is expired, the radio problem timer starting based on in-sync and out-of-sync notified from the PHY.
- (B) A timer is expired, the timer starting based on a measurement report of a specific measurement identifier being triggered while a radio problem timer is running.
- (C) A random access procedure fails.
- (D) RLC failure is detected.

The terminal apparatus that has declared RLF in a MCG may remain in the RRC connected state, select an optimal cell, and start a re-establishment procedure. In addition, in a case that DC is configured, the terminal apparatus that has declared RLF may remain in the RRC connected state and notify the network of RLF.

The terminal apparatus may configure the reference signal used for RLM through the network by using RRC signaling. A radio link monitoring configuration (RadioLinkMonitoringConfig) may be used for the RRC signaling. The terminal apparatus may perform RLM by using one or more reference signals (referred to as RLM-RSs) configured by the radio link monitoring configuration. In addition, in a case that no RLM-RS is assigned, the terminal apparatus may perform RLM by using a predetermined reference signal. The radio link monitoring configuration may be configured for the terminal apparatus for each DL BWP. The radio link monitoring configuration may be configured for a DL BWP of a PCell and/or a PSCell. In a case that the condition of in-sync is satisfied, the PHY of the terminal apparatus may notify a higher layer (RRC layer) of the in-sync. In a case that the condition of out-of-sync is satisfied, the PHY of the terminal apparatus may notify a higher layer (RRC layer, etc.) of the out-of-sync.

The radio link monitoring configuration may include information indicating the purpose of monitoring and identifier information indicating the reference signal. For example, the purpose of monitoring may include the purpose of monitoring radio link failure, the purpose of monitoring beam failure, both of the purposes, or the like. In addition, for example, the identifier information indicating the reference signal may include information indicating SSB-Index of an SSB of the cell. In addition, for example, the identifier information indicating the reference signal may include information indicating the identifier linked to a channel state information reference signal (CSI-RS) configured for the terminal apparatus.

If no RLM-RS is provided to the terminal apparatus and (multiple) TCI state(s) for PDCCH reception including one or more CSI-RSs are provided, the terminal apparatus performs some or all of the following (A) and (B).
- (A) In a case that an activated TCI state for PDCCH reception includes only one reference signal, the reference signal provided in the activated TCI state is used for radio link monitoring.
- (B) In a case that the activated TCI state for PDCCH reception includes two reference signals, the QCL type of one reference signal is expected to be configured to type D, and the reference signal whose QCL type is configured to type D is used for radio link monitoring.

If multiple DL BWPs to be described below are configured in a certain serving cell, the terminal apparatus may perform RLM by using a reference signal corresponding to an RLM-RS in an active DL BWP to be described below. In addition, if multiple downlink BWPs to be described below are configured in a certain serving cell and no RLM-RS is provided in an active DL BWP to be described below, the terminal apparatus may perform RLM by using (multiple) reference signal(s) provided in an activated TCI state for receiving the PDCCH in a CORESET of the active DL BWP. Performing RLM by the terminal apparatus may be rephrased as assessing the radio link quality by the PHY of the terminal apparatus. In addition, the PHY may notify a higher layer (such as RRC) of out-of-sync in a case that the measured radio link quality becomes worse than a configured threshold.

Various embodiments will be described based on the foregoing description. Further, each of the processing operations described above may be applied to processing operations omitted in the following description.

Figure 8:
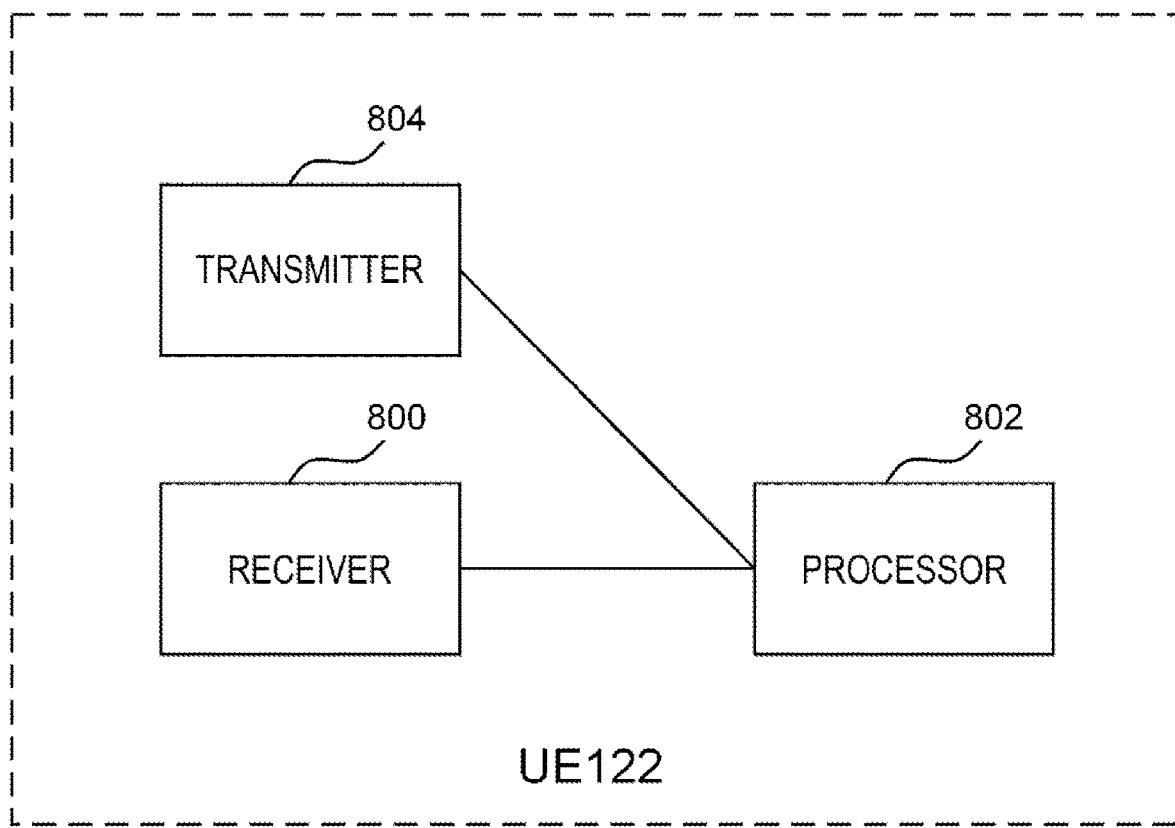
FIG. 8 is a block diagram illustrating a configuration of a terminal apparatus according to the present embodiment.

FIG. 8 is a block diagram illustrating a configuration of the terminal apparatus (UE 122) according to the present embodiment. Further, FIG. 8 illustrates only the main constituent portions closely related to the present embodiment in order to avoid complexity of description.

The UE 122 illustrated in FIG. 8 includes a receiver 800 that receives control information (SCI, MAC-control elements, RRC signaling, etc.), information including discovery messages, user data, etc. from another terminal apparatus, a processor 802 that performs processing according to parameters included in the received control information, etc., and a transmitter 804 that transmits control information (SCI, MAC-control elements, RRC signaling, etc.), information including discovery messages, and user data, etc. to another terminal apparatus. In addition, the processor 802 may include some or all of the functions of various layers (e.g., the physical layer, the MAC layer, the RLC layer, the PDCP layer, the SDAP layer, the RRC layer, the PC5-S layer, the discovery layer, and the app layer). In other words, the processor 802 may include some or all of a physical layer processor (PHY processor), a MAC layer processor (MAC processor), an RLC layer processor (RLC processor), a PDCP layer processor (PDCP processor), an SDAP layer processor (SDAP processor), an RRC layer processor (RRC processor), a PC5-S layer processor (PC5-S processor), a discovery layer processor (discovery processor), and an app layer processor.

Figure 9:
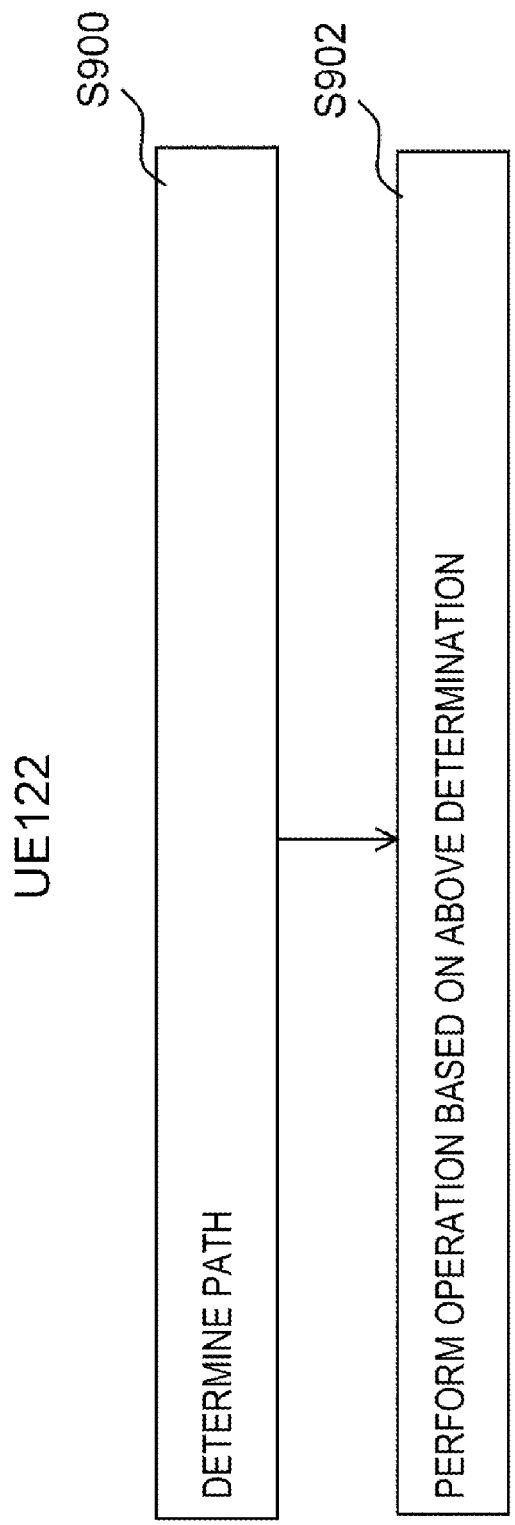
FIG. 9 is a diagram illustrating an example of processing of the terminal apparatus according to the present embodiment.

FIG. 9 illustrates an example of an embodiment according to the present invention.

In a case that radio link failure is detected on a direct path, the UE 122 that communicates with a base station apparatus by using the direct path and an indirect path determines a path in step S900 and performs an operation based on the determination in step S902.

In a case that a signaling radio bearer (SRB) is not configured with a split bearer, the determination of a path may be determining whether the signaling radio bearer is configured on the direct path in step S900. The determination that the signaling radio bearer is configured on the direct path may be a determination that the signaling radio bearer is not configured on the indirect path, and the determination that the signaling radio bearer is not configured on the direct path may be a determination that the signaling radio bearer is configured on the indirect path. In a case that the UE 122 determines that the signaling radio bearer is configured on the direct path, the operation may be starting an RRC reestablishment procedure in step S902. Additionally or alternatively, in a case that it is determined that the signaling radio bearer is configured on a direct path, the operation may be to transmit first information to a relay terminal apparatus configured on an indirect path in step S902. Transmitting the first information to the relay terminal apparatus configured on the indirect path may be paraphrased as transmitting the first information by PC5-RRC signaling using a PC5-RRC connection between the UE 122 and the relay terminal apparatus, transmitting the first information using sidelink signaling radio bearer 3 (SL-SRB3) between the UE 122 and the relay terminal apparatus, or the like. In addition, in a case that it is determined that the signaling radio bearer is not configured on the direct path, the operation may be transmitting the first information using the signaling radio bearer in step S902. The signaling radio bearer may be a bearer for transmitting the first information, and additionally or alternatively, may be an SRB1.

In addition, in a case that the signaling radio bearer is configured as a split bearer, the determination of the path in step S900 may be determining whether some or all of the following conditions are satisfied.
  (a) The signaling radio bearer is not configured with PDCP duplication.
  (b) A primary path of the signaling radio bearer is configured on a direct path.

In a case that it is determined that (a) and (b) are satisfied, the operation may be configuring a primary path on the indirect path and transmitting the first information by using the signaling radio bearer in step S902. In addition, in a case that (a) is not satisfied, the operation may be transmitting the first information by using the signaling radio bearer in the step S902. In addition, in a case that it is determined that (a) is satisfied but (b) is not satisfied, the operation may be transmitting the first information by using the signaling radio bearer in the step S902.

The first information may be information indicating radio link failure of a direct path.

The first information may include some or all of the following information.
  (I-1) Information indicating the type of failure.
  (I-2) Information indicating a frequency-related measurement result configured to be measured by the UE 122 by the base station apparatus.
  (I-3) A remote terminal identifier (remote UE ID) configured for the UE 122.
  (I-4) A relay terminal identifier (relay UE ID) configured for the relay terminal apparatus.

In addition, FIG. 9 illustrates another example of the embodiment according to the present invention.

In a case that radio link failure is detected on the indirect path, the UE 122 that communicates with a base station apparatus by using the direct path and the indirect path determines a path in step S900 and performs an operation based on the determination in step S902.

That the UE 122 detects the radio link failure on the indirect path may be that sidelink radio link failure has been detected in a link between the UE 122 and the relay terminal apparatus configured on the indirect path, and that the UE 122 has received a notification indicating that radio link failure has been detected between the relay terminal apparatus and the base station apparatus from the relay terminal apparatus. The notification may be not only a notification indicating that radio link failure has been detected between the relay terminal apparatus and the base station apparatus, but also a notification indicating that the relay terminal apparatus has failed in Uu RRC establishment or Uu RRC resumption, a notification indicating that the relay terminal apparatus performs reconfiguration with sync, or a notification indicating that the relay terminal apparatus performs cell reselection.

In a case that a signaling radio bearer is not configured with a split bearer, the determination of a path may be determining whether the signaling radio bearer is configured on the indirect path in step S900. The determination that the signaling radio bearer is configured on the indirect path may be a determination that the signaling radio bearer is not configured on the direct path, and the determination that the signaling radio bearer is not configured on the indirect path may be a determination that the signaling radio bearer is configured on the direct path. In a case that it is determined in step S902 that the signaling radio bearer is configured on an indirect path, the operation may be starting an RRC connection reestablishment procedure. In addition, in a case that it is determined that the signaling radio bearer is not configured on the indirect path, the operation may be transmitting the first information through the signaling radio bearer in step S902. The signaling radio bearer may be a bearer for transmitting the first information, and additionally or alternatively, may be an SRB1.

In addition, in a case that the signaling radio bearer is configured with a split bearer, the determination of the path in step S900 may be determining whether some or all of the following conditions are satisfied.
  (a) The signaling radio bearer is not configured with PDCP duplication.
  (b) A primary path of the signaling radio bearer is configured on an indirect path.

In a case that it is determined that (a) and (b) are satisfied, the operation may be configuring a primary path on the direct path and transmitting the first information by using the signaling radio bearer in step S902. In addition, in a case that (a) is not satisfied, the operation may be transmitting the first information by using the signaling radio bearer in the step S902. In addition, in a case that it is determined that (a) is satisfied but (b) is not satisfied, the operation may be transmitting the first information by using the signaling radio bearer in the step S902.

The first information may be information indicating radio link failure of the indirect path. The first information may include some or all of the following information.
  (I-1) Information indicating the type of failure.
  (I-2) Information indicating a frequency-related measurement result configured to be measured by the UE 122 by the base station apparatus.
  (I-3) A remote terminal identifier (remote UE ID) configured for the UE 122.
  (I-4) A relay terminal identifier (relay UE ID) configured for the relay terminal apparatus.

Figure 10:
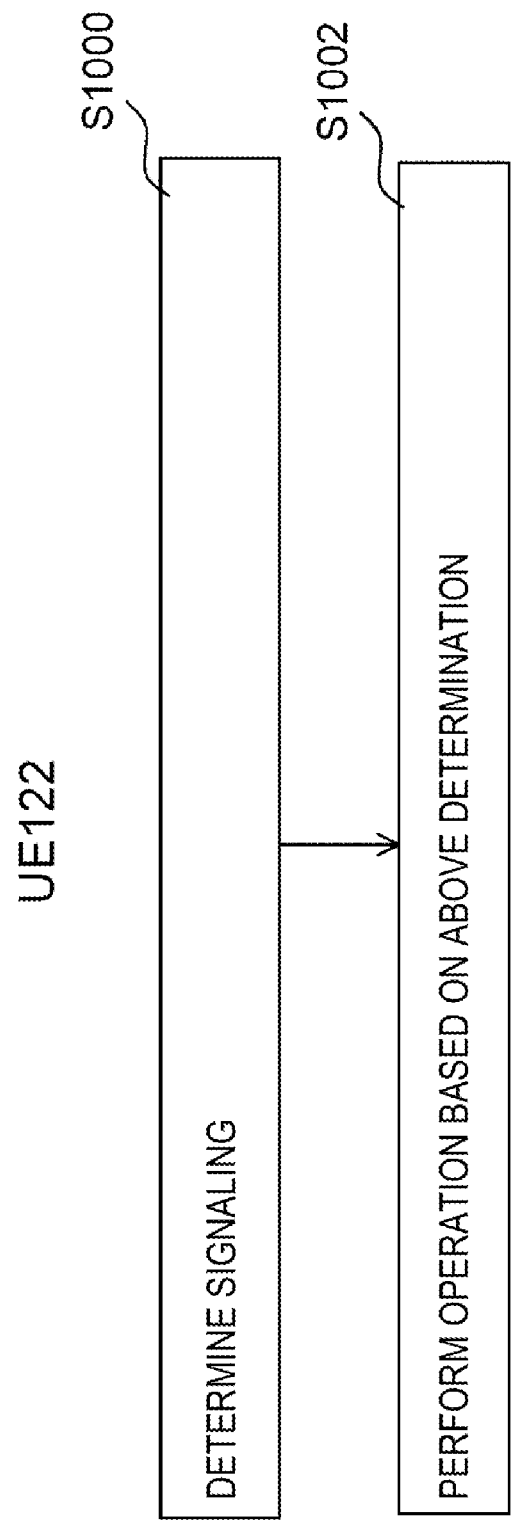
FIG. 10 is a diagram illustrating an example of processing of the terminal apparatus according to the present embodiment.

FIG. 10 illustrates an example of an embodiment according to the present invention.

The UE 122 communicating with a remote terminal apparatus determines signaling received from the remote terminal apparatus in step S1000 and performs an operation in step S1002.

The UE 122 may determine whether the signaling received from the remote terminal apparatus is the first information in the step S1000, and if it is determined that the signaling received from the remote terminal apparatus is the first information, the operation may be transferring the first information to the base station apparatus in the step S1002. In addition, the UE 122 may be a terminal apparatus serving as a relay terminal apparatus.

The first information may be information indicating radio link failure of a direct path configured for the remote terminal apparatus. The first information may include some or all of the following information.
  (I-1) Information indicating the type of failure.

(I-2) Information indicating a frequency-related measurement result configured to be measured by the UE 122 by the base station apparatus.

(I-3) Identifier configured for the remote terminal apparatus to identify the remote terminal.

(I-4) Identifier configured for the UE 122 to identify the relay terminal.

In step S1002, the UE 122 may transmit, to the base station apparatus, an identifier for identifying the remote terminal configured for the remote terminal apparatus together with the first information, and may additionally or alternatively transmit, to the base station apparatus, an identifier for identifying the relay terminal configured for the UE 122 together with the first information.

Further, in each embodiment, the link between the remote terminal apparatus and the relay terminal apparatus may be a link via a PC5 interface or another link having a similar function. In addition, the identifier for identifying the remote terminal may be a source L2ID, a destination L2ID, a cell-radio network temporary identifier (C-RNTI) configured for the remote terminal apparatus, a local identifier configured for L2 U2N remote UE, or another identifier by which the remote terminal apparatus is identifiable. In addition, the identifier for identifying the relay terminal may be a source L2ID, a destination L2ID, a C-RNTI configured for the relay terminal apparatus, a local identifier configured for L2 U2N remote UE, or another identifier by which the relay terminal apparatus is identifiable.

Further, in each embodiment, transmitting the first information by using a signaling radio bearer (for sidelink) may be rephrased as submitting the first information to a lower layer via the signaling radio bearer (for sidelink), or may be rephrased in another expression for exhibiting a similar function. In addition, in each embodiment, the UE 122 transmits the first information by using the signaling radio bearer (for sidelink), so that the UE 122 can transmit the first information to the base station apparatus. Further, the embodiments may be combined with each other, and an embodiment obtained by combining the embodiments is also included in the technical scope of the present invention.

In a multi-path relay, there may be a case that radio link failure is detected on a direct path and/or an indirect path. According to the example of each embodiment of the present invention, it is possible to notify the base station apparatus of the fact that radio link failure has been detected on any path.

In addition, in the above description, expressions such as "notified", "being pointed out", and the like may be paraphrased with each other.

In addition, in the above description, expressions such as "linked", "associated", "related", and the like may be paraphrased with each other.

In addition, in the above description, expressions such as "included", "being included", "have been included", and the like may be paraphrased with each other.

In addition, in the above description, "the" may be rephrased with "the above-described".

In addition, in the above description, expressions such as "confirmed as", "being configured", "being included", and the like may be paraphrased with each other.

In addition, in the example of each processing operation or the example of the flow of each processing operation in the above description, some or all of the steps need not be performed. In addition, in the example of each processing operation or the example of the flow of each processing operation in the above description, order of the steps may be different. In addition, in the example of each processing operation or the example of the flow of each processing operation in the above description, part or all of the processing operations in each step may not be performed. In addition, in the example of each processing operation or the example of the flow of each processing operation in the above description, order of processing operations in each step may be different. In addition, in the above description, "perform B based on being A" may be rephrased with "perform B". In other words, "perform B" may be performed independently of "being A".

Further, in the above description, "A may be rephrased with B" may include the meaning "B is rephrased with A" in addition to "A is rephrased with B". In addition, in a case that the above description contains "C may be D" and "C may be E", the expression includes the meaning "D may be E". In addition, in a case that the above description contains "F may be G" and "G may be H", the expression includes the meaning "F may be H".

In addition, in the above description, in a case that a condition "A" and a condition "B" are conflicting conditions, the condition "B" may be expressed as "the other" condition of the condition "A".

A program running on an apparatus according to the present embodiment may serve as a program that controls a central processing unit (CPU) and the like to cause a computer to operate in such a manner as to realize the functions of the present embodiment. Programs or the information handled by the programs are temporarily loaded into a volatile memory such as a random access memory (RAM) while being processed, or stored in a non-volatile memory such as a flash memory, or a hard disk drive (HDD), and then read, modified, and written by the CPU, as necessary.

Further, some of the apparatuses in the above-described embodiment may be partially realized by a computer. In such a case, a program for realizing such control functions may be recorded on a computer-readable recording medium to cause a computer system to read and execute the program recorded on this recording medium. It is assumed that the "computer system" mentioned here refers to a computer system built into the apparatuses, the computer system including an operating system and hardware components such as peripheral devices. In addition, the "computer-readable recording medium" may be any of a semiconductor recording medium, an optical recording medium, a magnetic recording medium, and the like.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores a program for a fixed period of time, such as a volatile memory included in the computer system functioning as a server or a client in such a case. Furthermore, the above-described program may be configured to realize some of the functions described above, and additionally may be configured to realize the functions described above, in combination with a program already recorded in the computer system.

In addition, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general-purpose processor, a digital signal processor (DSP), an application-specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of a known type, a controller, a micro-controller, or a state machine instead. The general-purpose processor or the above-mentioned circuits may include a digital circuit or an analog circuit. In addition, in a case that a circuit integration technology appears that replaces the present integrated circuits with advances in the semiconductor technology, it is also possible to use an integrated circuit based on the technology.

Further, the present embodiment is not limited to the above-described embodiments. Although apparatuses have been described as an example in the embodiment, the present embodiment is not limited thereto, and is applicable to a stationary-type or a non-movable-type electronic apparatus installed indoors or outdoors, for example, a terminal apparatus or a communication apparatus such as an AV device, a kitchen device, a cleaning or washing machine, an air-conditioning device, office equipment, a vending machine, and other household appliances.

Although the embodiment of the present invention has been described in detail above referring to the drawings, the specific configuration is not limited to the embodiment and includes, for example, design changes within the scope that does not depart from the gist of the embodiment. In addition, various modifications can be made on the present embodiment within the scope of the claims, and embodiments that are made by suitably combining technical means disclosed according to the different embodiments are also included in the technical scope of the embodiment. In addition, a configuration in which components, which are described in the embodiment described above, having similar effects are interchanged is also included in the present disclosure.

REFERENCE SIGNS LIST 100 ng-eNB
102 gNB
110, 112, 114 Interface
122 UE
200 PHY
202 MAC
204 RLC
206 PDCP
208 RRC
210 PC5-S
310 SDAP
400 Discovery
500 PHY
502 MAC
504 RLC
506 PDCP
508 RRC
510 SDAP
600 SRAP
800 Receiver
802 Processor
804 Transmitter

The invention claimed is:

1. A terminal apparatus for communicating with a base station apparatus by using a direct path and an indirect path, the terminal apparatus comprising:
a processor; and
a transmitter, wherein:
the direct path is a path through which the terminal apparatus communicates with the base station apparatus via a Uu interface,
the indirect path is a path through which the terminal apparatus communicates with the base station apparatus via a relay terminal apparatus, an interface between the terminal apparatus and the relay terminal apparatus being a PC5 interface, and
in a case that the processor detects a radio link failure on the direct path and a signaling radio bearer is configured as a split bearer:
the processor switches a primary path of the signaling radio bearer from the direct path to the indirect path based on a determination that the signaling radio bearer is not configured with a packet data control protocol (PDCP) duplication and a determination that the primary path has been configured on the direct path, and
the transmitter transmits information indicating the radio link failure of the direct path via the signaling radio bearer on the indirect path.

2. A method performed by a terminal apparatus for communicating with a base station apparatus by using a direct path and an indirect path, wherein:
the direct path is a path through which the terminal apparatus communicates with the base station apparatus via a Uu interface, and
the indirect path is a path through which the terminal apparatus communicates with the base station apparatus via a relay terminal apparatus, an interface between the terminal apparatus and the relay terminal apparatus being a PC5 interface, the method comprising:
in a case that a radio link failure is detected on the direct path and a signaling radio bearer is configured as a split bearer:
switching a primary path of the signaling radio bearer from the direct path to the indirect path based on a determination that the signaling radio bearer is not configured with a packet data control protocol (PDCP) duplication and a determination that the primary path has been configured on the direct path, and
transmitting information indicating the radio link failure of the direct path via the signaling radio bearer on the indirect path.

3. An integrated circuit implemented in a terminal apparatus for communicating with a base station apparatus by using a direct path and an indirect path, wherein:
the direct path is a path through which the terminal apparatus communicates with the base station apparatus via a Uu interface,
the indirect path is a path through which the terminal apparatus communicates with the base station apparatus via a relay terminal apparatus, an interface between the terminal apparatus and the relay terminal apparatus being a PC5 interface, and
in a case that a radio link failure is detected on the direct path and a signaling radio bearer is configured as a split bearer, the integrated circuit causes the terminal apparatus to perform:
a function of switching a primary path of the signaling radio bearer from the direct path to the indirect path based on a determination that the signaling radio bearer is not configured with a packet data control protocol (PDCP) duplication and a determination that the primary path has been configured on the direct path, and a function of transmitting information indicating the radio link failure of the direct path via the signaling radio bearer on the indirect path.

\* \* \* \* \*